(12) United States Patent
Masumoto

(10) Patent No.: US 8,754,906 B2
(45) Date of Patent: Jun. 17, 2014

(54) DIAGNOSIS ASSISTING SYSTEM, DIAGNOSIS ASSISTING METHOD, AND COMPUTER READABLE RECORDING MEDIUM HAVING DIAGNOSIS ASSISTING PROGRAM RECORDED THEREON

(75) Inventor: Jun Masumoto, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 546 days.

(21) Appl. No.: 12/893,943

(22) Filed: Sep. 29, 2010

(65) Prior Publication Data

US 2011/0074813 A1 Mar. 31, 2011

(30) Foreign Application Priority Data

Sep. 30, 2009 (JP) ................................. 2009-225840
Apr. 21, 2010 (JP) ................................. 2010-097667

(51) Int. Cl.
*G09G 5/14* (2006.01)
*G06T 17/05* (2011.01)

(52) U.S. Cl.
CPC ..................................... *G06T 17/05* (2013.01)
USPC ............ 345/629; 345/619; 345/581; 345/440

(58) Field of Classification Search
CPC ....................................................... G06T 17/05
USPC .................... 345/629, 619, 581, 440
See application file for complete search history.

(56) References Cited

U.S. PATENT DOCUMENTS

| | | | |
|---|---|---|---|
| 6,243,095 B1 * | 6/2001 | Shile et al. ..................... 715/854 |
| 6,853,357 B2 * | 2/2005 | Inoue et al. ....................... 345/9 |
| 6,891,374 B2 * | 5/2005 | Brittain .......................... 324/309 |
| 6,900,635 B1 * | 5/2005 | Petropoulos et al. .......... 324/318 |
| 7,002,344 B2 * | 2/2006 | Griswold et al. .............. 324/309 |
| 7,620,229 B2 | 11/2009 | Oosawa |
| 7,646,903 B2 | 1/2010 | Kaftan et al. |
| 8,050,483 B2 * | 11/2011 | Boese et al. ................... 382/132 |
| 2002/0050986 A1 | 5/2002 | Inoue et al. |
| 2004/0152068 A1 * | 8/2004 | Goldstein et al. ................. 435/4 |
| 2005/0105828 A1 | 5/2005 | Oosawa |
| 2006/0058624 A1 * | 3/2006 | Kimura ......................... 600/407 |

(Continued)

FOREIGN PATENT DOCUMENTS

| | | |
|---|---|---|
| JP | 2002-052018 A | 2/2002 |
| JP | 2008-171264 A | 7/2008 |
| JP | 2009-000342 A | 1/2009 |
| JP | 2009-072412 A | 4/2009 |

OTHER PUBLICATIONS

Temporal Magic Lens: Combined Spatial and Temporal Query and Presentation, Kathy Ryall, Qing Li, and Alan Esenther TR2005-031 Jul. 2005.*

(Continued)

*Primary Examiner* — Javid A Amini
(74) *Attorney, Agent, or Firm* — Sughrue Mion, PLLC

(57) ABSTRACT

A plurality of sets volume data obtained for a specified subject on different imaging dates/times are selected. At least one image for observation is generated for each selected set of volume data for the specified subject. Layered images are generated by positioning and overlapping the generated plurality of images for observation. The layered images are arranged on a predetermined screen, and operations that move a point along a temporal axis on the screen are detected. The display of each image for observation that constitutes the layered image arranged on the screen is changed based on the detected operations.

10 Claims, 19 Drawing Sheets

(56) References Cited

U.S. PATENT DOCUMENTS

| | | | |
|---|---|---|---|
| 2008/0242977 A1 | 10/2008 | Sirohey et al. | |
| 2009/0080744 A1* | 3/2009 | Sagawa | 382/131 |
| 2009/0080779 A1* | 3/2009 | Chefd'hotel et al. | 382/209 |
| 2009/0326373 A1* | 12/2009 | Boese et al. | 600/440 |
| 2011/0026786 A1* | 2/2011 | Mohamed | 382/128 |

OTHER PUBLICATIONS

Chapter 4. Preparation and display of Image Data by Joseph V. Hajnal (Nov. 10, 2000).*

European Office Action for Appln. No. 10180896.2-2218; Feb. 2, 2012.

Extended European Search Report, dated Mar. 15, 2011; Appln. S.N.: 10180896.2-2218.

Medical Image Registration, Preparation and Display of Image Data, Joseph V. Hajnal, Chapters 4,1-4.7; XP-002454906; 0-8493-0064-9/01; 2001.

Temporal Magic Lens: Combined Spatial and Temporal Query and Presentation; Kathy Ryall, et al.; M.F. Costabile and F. Patemo: Interact 2005, LNCS 3585, pp. 809-822, 2005.

Cardio Viz3d: Cardiac Simulation Data Processing and Visualization, User Manual; Nicolas Toussaint, Apr. 28, 2008; INRIA Sophia Antipolis—Research Project ASCLEPIOS. 2004, route des Lucioles; BP 93 0902 Sophia antipolis Cedex Frame.

Japanese Office Action Dated Nov. 12, 2013 issued in Japanese Patent Application No. 2010-097667.

* cited by examiner

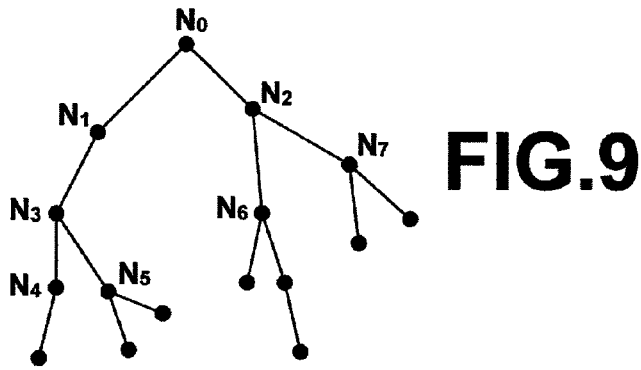
FIG. 9
FIG. 10
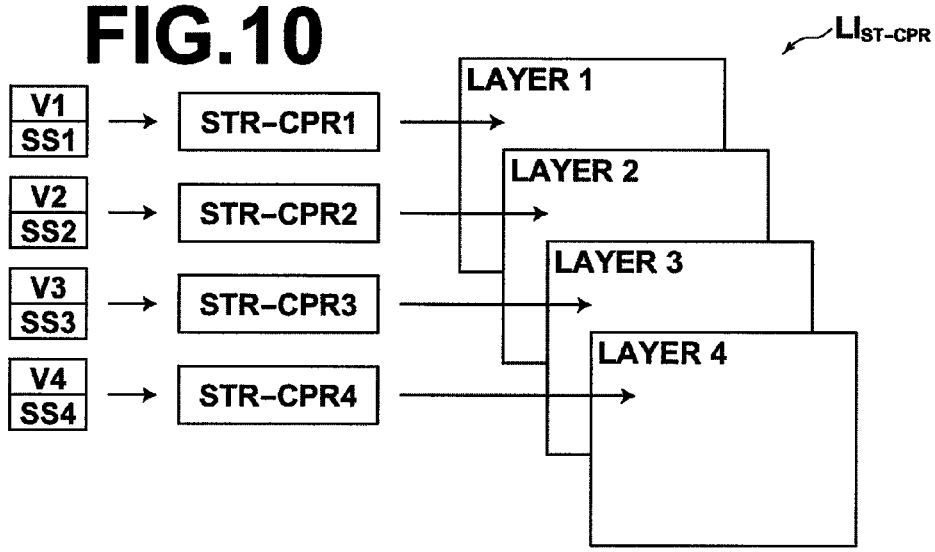
FIG. 11
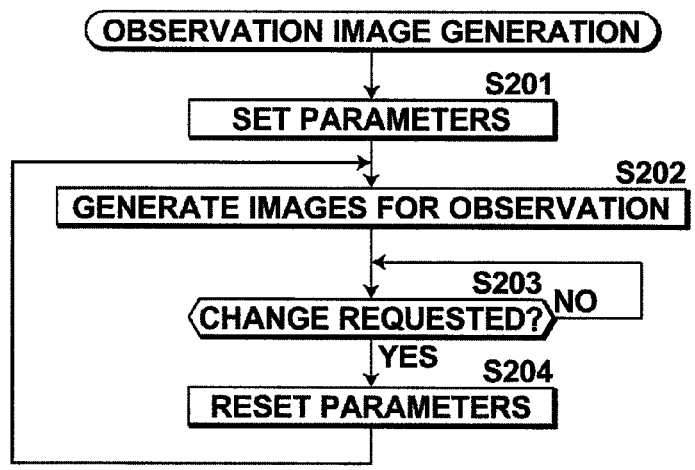

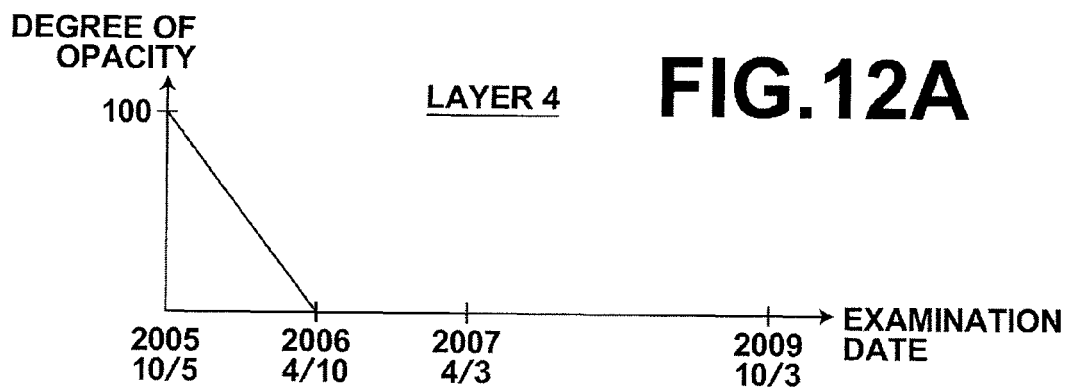
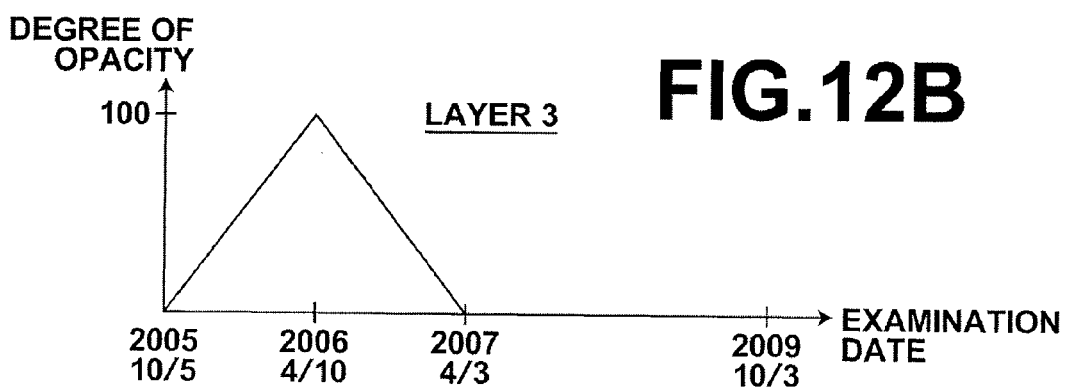
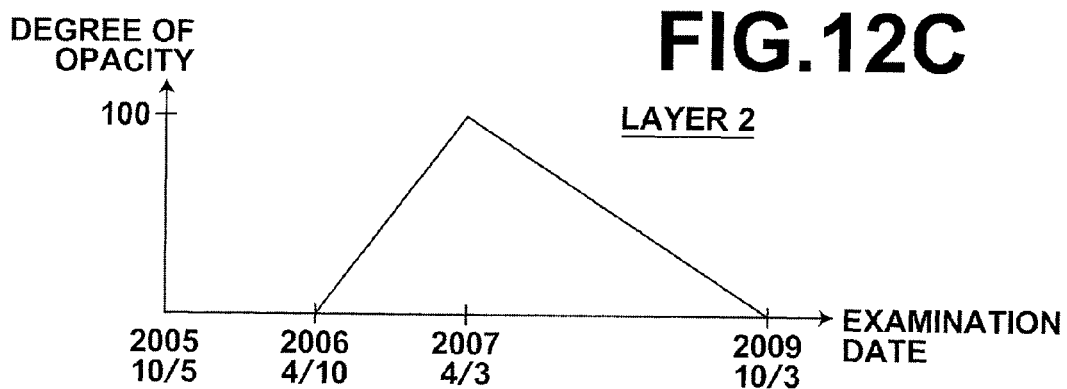
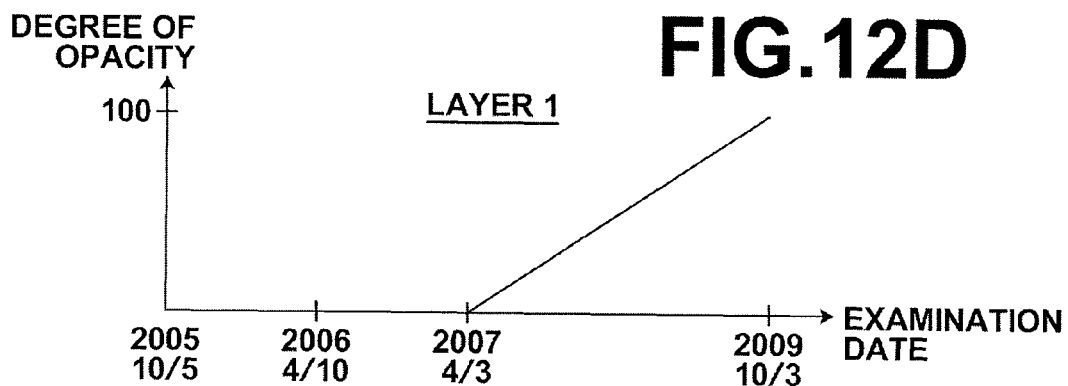

▨ IMAGE OBTAINED ON 10/5/2005

☐ IMAGE OBTAINED ON 4/10/2006

FIG.15B
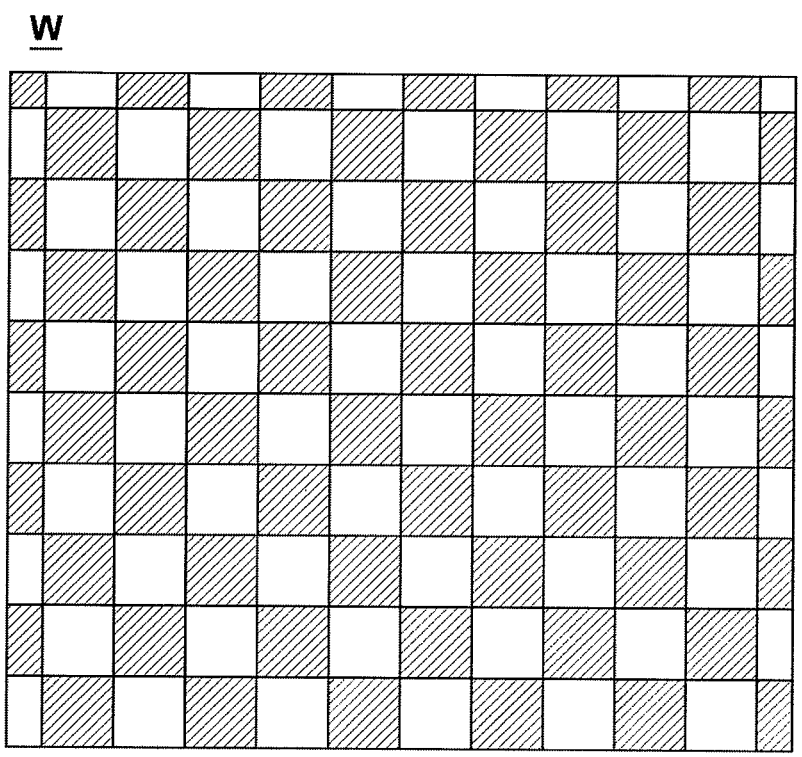
 IMAGE OBTAINED ON 10/5/2005
 IMAGE OBTAINED ON 4/10/2006

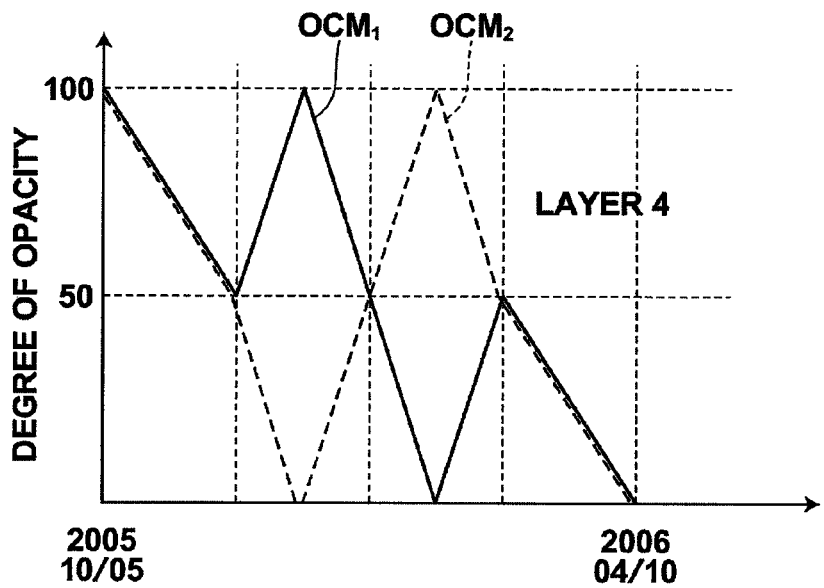
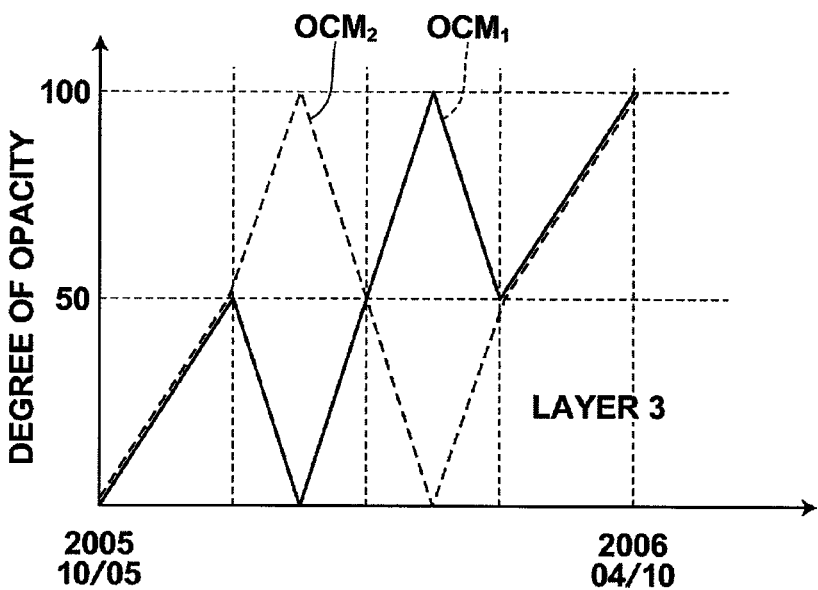

US 8,754,906 B2

DIAGNOSIS ASSISTING SYSTEM, DIAGNOSIS ASSISTING METHOD, AND COMPUTER READABLE RECORDING MEDIUM HAVING DIAGNOSIS ASSISTING PROGRAM RECORDED THEREON

BACKGROUND OF THE INVENTION

1. Field of the Invention

The present invention is suited for utilization in the medical field, and is related to a system and a method for assisting image diagnosis using three dimensional image data. The present invention is also related to a computer readable recording medium having a diagnosis assisting computer program stored thereon.

2. Description of the Related Art

In image diagnosis, there are cases in which images of a subject obtained during recent examinations (hereinafter, referred to as "current images") are compared against images of the same subject obtained in previous examinations (hereinafter, referred to as "past images"), to confirm changes in symptoms of disease (hereinafter, referred to as "comparative image observation"). For this reason, many diagnosis assisting apparatuses are equipped with the function of selecting past images that represent the same position of a subject within an image which is currently being observed from a database of past images, and displaying the selected past images along with the observed current image.

A common user interface for comparative image observation displays a current image and a past image of the same size alongside each other on the screen of a monitor. An example of such a user interface is illustrated in FIG. 9, FIG. 11, and FIG. 12 of U.S. Patent Application Publication No. 20090080744. These figures illustrate screens of monitors, on which current images and past images having the same slice positions are displayed alongside each other during comparison of slice images obtained by a CT apparatus or the like. In addition, FIG. 15 of this document illustrates a case in which the contents of display of the monitor screen are switched between a current image and a past image by a scrolling operation. Further, a system in which two or more monitors are connected to a diagnosis assisting apparatus, a group of current images is displayed on one monitor, and groups of past images are displayed on one or a plurality of other monitors, is also proposed.

When using an interface that displays current images and past images alongside each other on the screen of a single monitor or on the screens of a plurality of monitors, physicians who observe the images must view the images while moving their lines of sight vertically and horizontally. Particularly in systems which are equipped with three or more monitors that are arranged vertically and horizontally, there are cases in which the physicians' heads must be rotated in addition to changing their lines of sight. These interfaces are likely to cause fatigue of the eyes and sore shoulders. On the other hand, when using an interface that switches between display of a current image and a past image by a scrolling operation, physicians must perform comparisons while one of the images is not within their fields of view (while retaining one of the images within their memories). This type of operation exerts a burden on the physicians' brains, and is likely to cause nervous fatigue.

SUMMARY OF THE INVENTION

The present invention has been developed in view of the foregoing circumstances. It is an object of the present invention to provide a user interface that reduces physical/mental fatigue of physicians that perform image observation.

A diagnosis assisting system of the present invention is a system equipped with a volume data storage means, a volume data selecting means, an observation image generating means, a layered image generating means, and a display control means, to be described below. In addition, a diagnosis assisting program of the present invention, which is recorded on a computer readable non transitory recording medium, causes one or a plurality of computers to function as the volume data selecting means, the observation image generating means, the layered image generating means, and the display control means, to be described below. The diagnosis assisting program of the present invention is constituted by a plurality of program modules. The functions of each of the aforementioned means are realized by one or a plurality of program modules. The group of program modules is provided to users by being recorded in storage media such as CD-ROM's and DVD's, by being recorded in a storage unit attached to a server computer in a downloadable state, or by being recorded in network storage in a downloadable state. A diagnosis assisting method of the present invention is a method that assists diagnosis, by causing a single computer or a plurality of computers to execute the processes of the volume data storage means, the volume data selecting means, the observation image generating means, the layered image generating means, and the display means, to be described later.

The volume data storage means stores a plurality of sets of volume data, obtained by imaging at least one subject on different imaging dates, in a predetermined storage device, correlated with subject identifying data and imaging date/time data. The storage device may be an internal memory or a storage of a computer that constitutes the diagnosis assisting system, an external storage device which is connected to the computer either directly or via a network, or the like.

Note that the term "subject" refers to a target of examination, that is, a portion which is the target of imaging and diagnosis. For example, in the case that the lungs and the stomach of a single patient are examined, there are two subjects, although there is only one patient. In this case, it is preferable for the subject identifying data to include both patient data and imaged portion data.

The volume data selecting means selects a plurality of sets of volume data correlated with subject identifying data that represents a specified subject, from among the sets of volume data stored in the storage device. Thereby, a plurality of sets of volume data regarding the same subject obtained on different imaging dates/times are obtained. For example, in the case that three CT examinations are performed on a subject, three sets of volume data, each of which is obtained at each examination, are obtained.

The observation image generating means generates at least one image for observation that represents the specified subject for each set of volume data selected by the volume data selecting means. The observation image generating means also correlates the images for observation and the imaging date/time data of the set of volume data corresponding thereto.

The layered image generating means generates layered images, by positioning and overlapping the generated plurality of images for observation. That is, the layered image generating means generates images constituted by a plurality of layers, in which each layer is a single image for observation.

The display control means arranges the layered images generated by the layered image generating means on a predetermined screen. The display control means controls display such that a single layered image is arranged within a single screen, for example. Alternatively, the display control means'controls display such that a layered image is arranged within an image widow, when a plurality of image windows are provided within a single screen. As a further alternative, the display control means controls display such that a layered image is arranged within each of a plurality of image window, in the case that a plurality of layered images are generated. Note that the image windows may be windows which are arranged to overlap each other at a desired position within a display screen, or may be each of a plurality of regions into which the display screen is divided.

Further, the display control means detects operations that move a point along a temporal axis on the screen. For example, operations of a slider which is displayed on the screen are detected as operations that move a point along a temporal axis. Alternatively, operations that rotate the wheel of a mouse are detected as operations that move a point along a temporal axis. The display control means changes the display of each image for observation that constitutes the layered images arranged on the screen, based on the detected operations. Here, the expression "changes the display" refers to switching between display/non display of the images, changing display attributes (such as the degree of opacity), changing a display range, changing a display position, etc.

In the above configuration and procedures, a plurality of images that represent the state of a subject at different points in time appear at the same location of the screen. Accordingly, physicians who perform diagnosis can observe changes in the state of the subject over time. In addition, the switching of images which are displayed is performed in steps through a process in which a previously displayed image and an image to be displayed next are overlapped. Therefore, a plurality of images can be simultaneously observed and compared during the switching process.

In one embodiment, the display control means changes the degree of opacity of each image for observation that constitutes the layered image arranged on the screen. In this embodiment, it is preferable for the diagnosis assisting system to be configured to further comprise a degree of opacity control means, and for the display control means to change the degrees of opacity, based on the detected operations and the setting of the degree of opacity control means.

The degrees of opacity are controlled individually for each image for observation. Here, the "degrees of opacity" are represented by numerical values within a range from 0% to 100%, wherein 0% represents a completely transparent state, and 100% represents a completely opaque state.

For example, a configuration may be adopted, wherein: the degree of opacity control means sets the degree of opacity of the images for observation to be a maximum value when the point along the temporal axis is on the imaging date/time correlated to the images for observation, and sets the degree of opacity of the images for observation to become lower as the date indicated by the point becomes farther from the imaging date/time correlated to the images for observation.

If the point on the temporal axis is moved unidirectionally along the flow of time while display is controlled in this manner, an image for observation that represents the state of the subject at a certain time on a certain examination date (imaging date/time) will gradually appear, become completely opaque, then gradually disappear. Further, an image that represents the state of the subject on a next examination date will gradually appear, become completely opaque, then gradually disappear. During this process, images of the subject obtained on different examination dates are displayed overlapped on each other in semitransparent states. In the state that the two images are displayed overlapping each other, the physician who performs diagnosis can simultaneously observe and compare the states of the subject at different points in time, while focusing on a single point.

Here, under the control as described above, there are cases in which three or more images will be overlapped and displayed, if a layered image is constituted by three or more images for observation, that is, three or more examinations have been performed. In order to avoid such overlapping display, it is preferable for the degree of opacity control means to the degree of opacity of each image for observation such that the degree of opacity of one or two of the plurality of images for observation is a value greater than 0%, and the degrees of opacity of other images for observation are 0%. For example, the slope of increase/decrease in opacity is set such that a first image for observation is completely transparent at the point in time that a third image for observation begins to appear, in the case that a layered image is constituted by three images for observation.

In another embodiment, the display control means sections the region in which the layered image is sectioned in the form of a lattice, and performs different display control within two groups of regions formed by alternately arranged lattice sections. That is, each image for observation is displayed in a state in which they are sectioned into lattices, and display is controlled such that an image for observation appears within a section in which another image for observation is being displayed. If two images for observation are arranged alternately in sections of a lattice, the display on the screen will appear as though a single image is being displayed, if the two images for observation are completely the same. However, if there are portions of the images for observation that differ, the display within adjacent sections will be shifted at these portions, and the lattice pattern will appear at these portions. Accordingly, in the case that there are locations at which changes occur between examination dates, such portions can be easily discriminated.

In yet another embodiment, the display control means performs stereoscopic display, by designating one image for observation from among the images for observation that constitute the layered image as a right field of view image, and designating another image for observation as a left field of view image. In this case, portions that differ will appear to user's eyes in a floating manner. Accordingly, in the case that there are locations at which changes occur between examination dates, such portions can be easily discriminated.

In still yet another embodiment, the positioning performed by the layered image generating means is one of rigid positioning or non rigid positioning; and the display control means performs morphing display. The morphing process is performed utilizing deformation vector fields which are estimated during the positioning process. In morphing control, if two images for observation are completely the same, the image displayed on the screen do not change. In the case that there are portions of the images for observation that differ, changes are observed corresponding to the operations for specifying the point along the temporal axis. Therefore, in the case that there are locations at which changes occur between examination dates, such portions can be easily discriminated.

In the configuration and procedures described above, the observation image generating means may generate a plurality of images for observation having different observation formats from each set of volume data. In this case, the layered image generating means generates layered images, in which images for observation of the same observation format are overlapped, for each observation format, and the display control means arranges the plurality of generated layered images on the screen.

Note that the expression "different observation formats" refers to differences in the method of representation by which the subject is represented. That is, the portion of the subject which is focused on and how this portion is presented to a user differ. For example, images that are converted from volume data to two dimensional images by different conversion methods (the volume rendering method, the multi planar reconstruction method, etc.) are images having different observation formats. In addition, even if the conversion method is the same, images having different conversion parameters (viewpoint, direction of view, slice position, etc.) are images having different observation formats.

In the embodiment in which the plurality of layered images are displayed on the display screen, the display control means changes the display of each of the images for observation that constitute the layered images. Under such control, all, of the images which are displayed on the screen change in a stepwise manner to images obtained on a different examination date in a coordinated manner. Accordingly, in this case, the plurality of images which are displayed simultaneously on the screen represent the state of a subject on the same date.

Alternatively, the diagnosis assisting system may further comprise image window control means, for arranging a plurality of image windows, which are switchable between an active state and an inactive state, on the screen, and for controlling the switching thereof. In this case, the display control means arranges the layered images into each image window, and changes the display of images for observation that constitutes a layered image within an image window in the active state. Here, the active state refers to a state in which operational input can be received with respect to the contents displayed within an image window, and the inactive state refers to a state in which operational input cannot be received with respect to the contents displayed within an image window.

That is, when an operation that moves the point along the temporal axis is detected, the display control means detects the operation as an operation with respect to an image window in the active state, and changes the display of the images for observation that constitute a layered image arranged within the image window in the active state. Meanwhile, the display of the images for observation that constitute a layered image arranged within image windows in the inactive state are not changed, even if operations to move the point along the temporal axis are performed. Under such control, images that represent states during time periods (examination dates) which are most desired to be viewed can be displayed in each image window.

According to the diagnosis assisting system, the diagnosis assisting method, and the computer readable recording medium on which the diagnosis assisting program of the present invention is recorded, even in the case that a plurality of examinations has been performed in the past, and the number of images to be comparatively observed is great, users can perform comparative image observation with little fatigue.

BRIEF DESCRIPTION OF THE DRAWINGS

FIG. 9 is a diagram that illustrates an example of analysis results of volume data.

FIG. 10 is a diagram that illustrates the outlines of an observation image generating process and a layered image generating process.

FIG. 11 is a flow chart that illustrates the steps of the observation image generating process.

FIG. 12A is a diagram that illustrates an example of an opacity curve (layer 4).

FIG. 12B is a diagram that illustrates an example of an opacity curve (layer 3).

FIG. 12C is a diagram that illustrates an example of an opacity curve (layer 2).

FIG. 12D is a diagram that illustrates an example of an opacity curve (layer 1).

FIG. 15B is a diagram that illustrates another modification of lattice sections.

FIG. 18A is a diagram that illustrates another example of an opacity curve (layer 4).

FIG. 18B is a diagram that illustrates another example of an opacity curve (layer 3).

DESCRIPTION OF THE PREFERRED EMBODIMENTS

Figure 1:
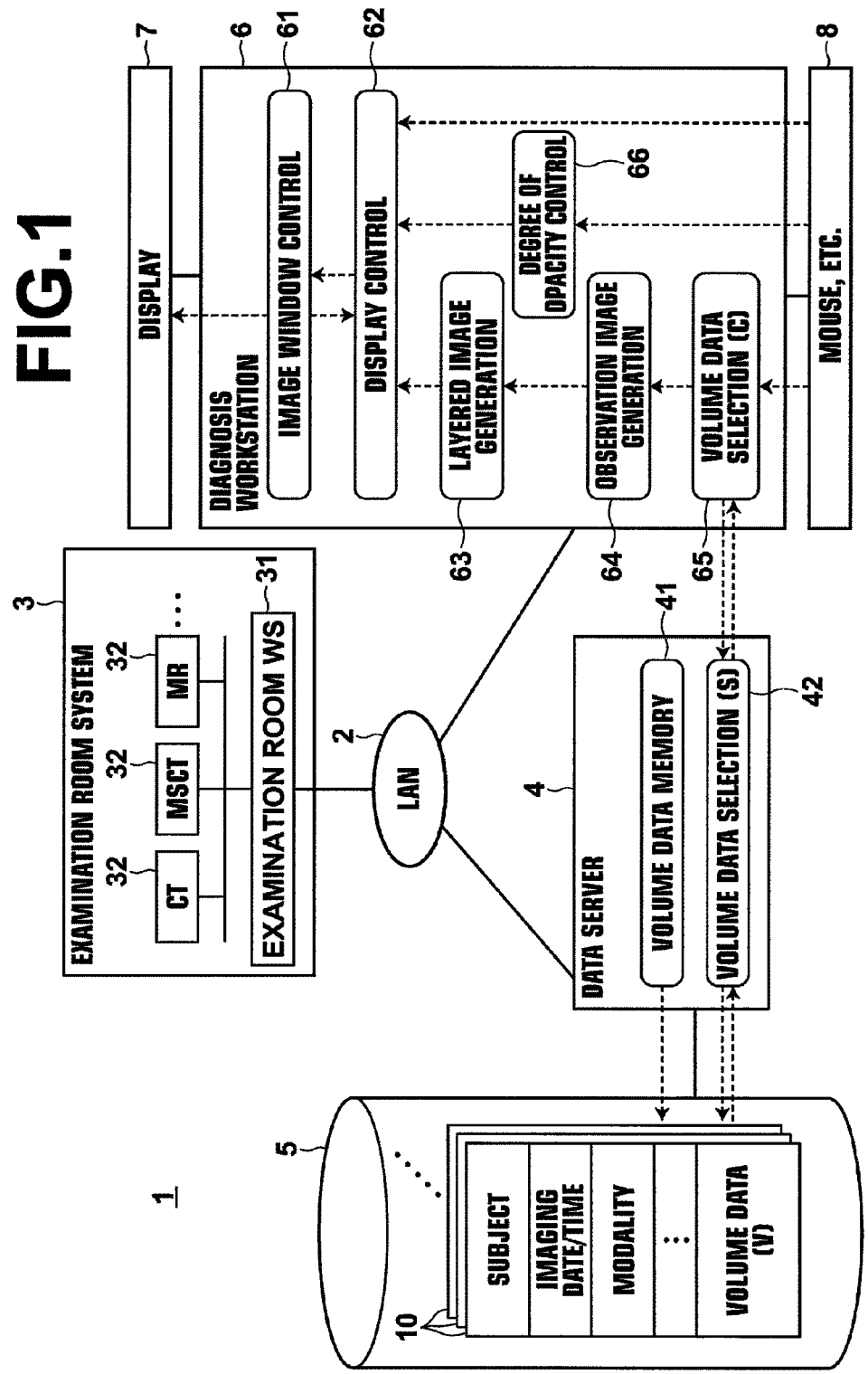
FIG. 1 is a diagram that illustrates the schematic structure of a diagnosis assisting system according to an embodiment of the present invention.

FIG. 1 illustrates the schematic structure of a diagnosis assisting system according to an embodiment of the present invention. The diagnosis assisting system of the present embodiment is constituted by: an examination room system 3; a data server 4; and a diagnosis workstation 6 (WS 6); which are connected to each other via a local area network 2 (LAN 2).

The examination room system 3 is constituted by: a modality group 32 for imaging subjects; and an examination room workstation 31 (WS 31) for confirming and adjusting images output from each modality.

In the case that the modality 32 is that which outputs two dimensional slice data (such as a CT (Computed Tomography) apparatus and an MR (Magnetic Resonance) apparatus), the examination room WS 31 reconstructs the groups of slice data to generate three dimensional volume data, and sends the generated volume data to the data server 4 along with appended data. In the case that the modality 32 is that which directly outputs volume data (such as a 3DCT apparatus and a cone beam CT apparatus), the examination room WS 31 sends the volume data to the data server 4 along with appended data.

The data server 4 is a comparatively high processing performance computer equipped with a high performance processor and a high capacity memory, in which a software program that provides the functions of a DBMS (Database Management Server) is installed. The program is stored in the memory, and executed by the processor. Thereby, the data server 4 functions as a volume data storage means 41 and as a volume data selecting means 42 on a server side (S).

The volume data storage means 41 causes the volume data and the appended data sent from the examination room WS 31 to be stored in a high capacity storage, which is connected to the data server 4, as files 10. Each of the files 10 includes a header region and a region in which the volume data are stored. The appended data which are sent from the examination room WS 31, and appended data to be used for data searching which the data server 4 adds are stored in the header region. For example, data that represent a patient ID number, name, age, sex, and imaged portions (head, chest, abdomen) are stored as data that specify subjects. In addition, data regarding the dates on which imaging was performed, and data regarding the times at which imaging was performed are stored as data that specify imaging dates/times. Further, data regarding the modality which was utilized for imaging, data regarding imaging conditions (whether an imaging agent was used, the pigment which was used, the radionuclide, the radiation dosage, etc.) are stored.

Note that the volume data which are stored in the high capacity storage 5 as files may be volume data output from imaging modalities as they are, or volume data obtained by reconstituting data (such as slice data) output from imaging modalities. Further, the volume data which are stored in the high capacity storage 5 may be volume data which has been processed, such as to remove data unnecessary for diagnosis from the volume data obtained by imaging.

The volume data selecting means 42 selects files that satisfy search conditions from among the plurality of files 10 stored in the high capacity storage 5, in response to search requests from the diagnosis WS 6. Then, the volume data selecting means 42 sends the selected files to the diagnosis WS 6.

The diagnosis WS 6 is a general purpose workstation equipped with a normal processor, memory and storage, in which programs that provide each of the functions to be described below are loaded. The programs are stored in the memory, and executed by the processor. By adopting this configuration, the diagnosis WS 6 functions as an image window control means 61, a display control means 62, a layered image generating means 63, an observation image generating means 64, a volume data selecting means 65 on the client side (C), and a degree of opacity control means 66. In addition, a display 7, and input devices 8 such as a keyboard and mouse are connected to the diagnosis WS 6.

Hereinafter, the functions, structure, and operations of the diagnosis WS 6 will be described further. The diagnosis WS 6 provides a variety of diagnosis assisting functions according to the type of tissue which is the target of diagnosis (organs, bones, muscles, blood vessels, etc.). The present invention is applicable regardless of the target of diagnosis. However, here, a case in which a function for assisting diagnosis of coronary arteries is selected will be described as an example.

First, the functions of the diagnosis WS 6 (mainly the user interface) will be described. If the function for assisting diagnosis of coronary arteries is selected in an initial screen, a dialog box for entering or selecting a value that specifies a patient (an ID number or the like) and a value that represents an imaging date/time appears. When a subject (patient and portion) and an imaging date/time are specified by user input or selection operations, a diagnosis screen that represents images of the coronary arteries of the specified subject on the specified imaging date and time is displayed.

Figure 2A:
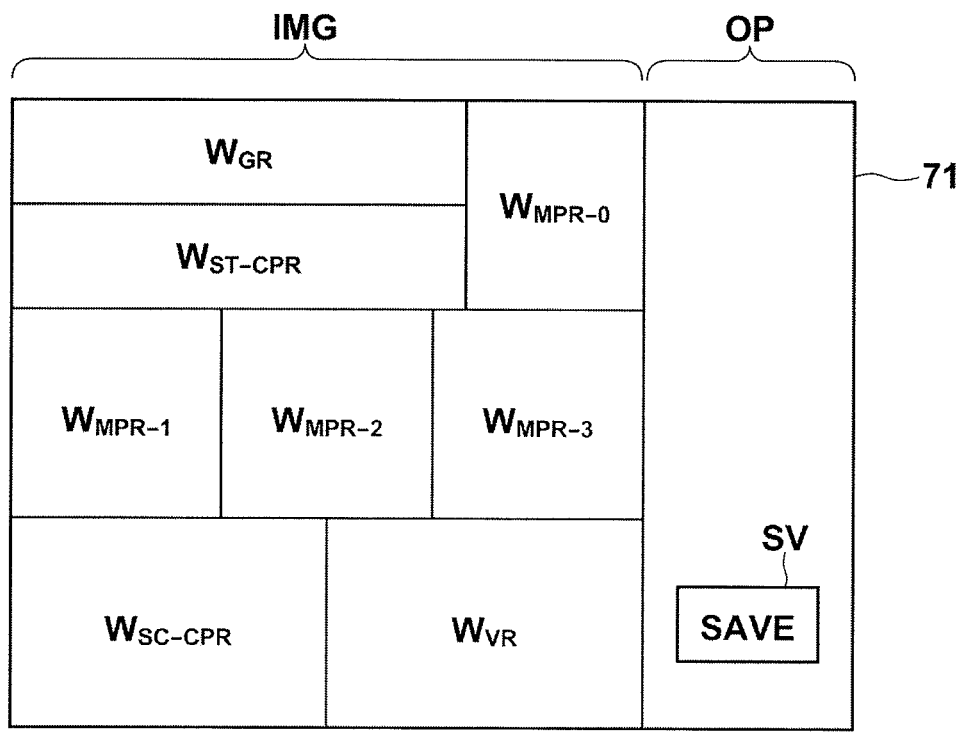
FIG. 2A is a diagram that illustrates a first example of the layout of a diagnosis screen.
Figure 2B:
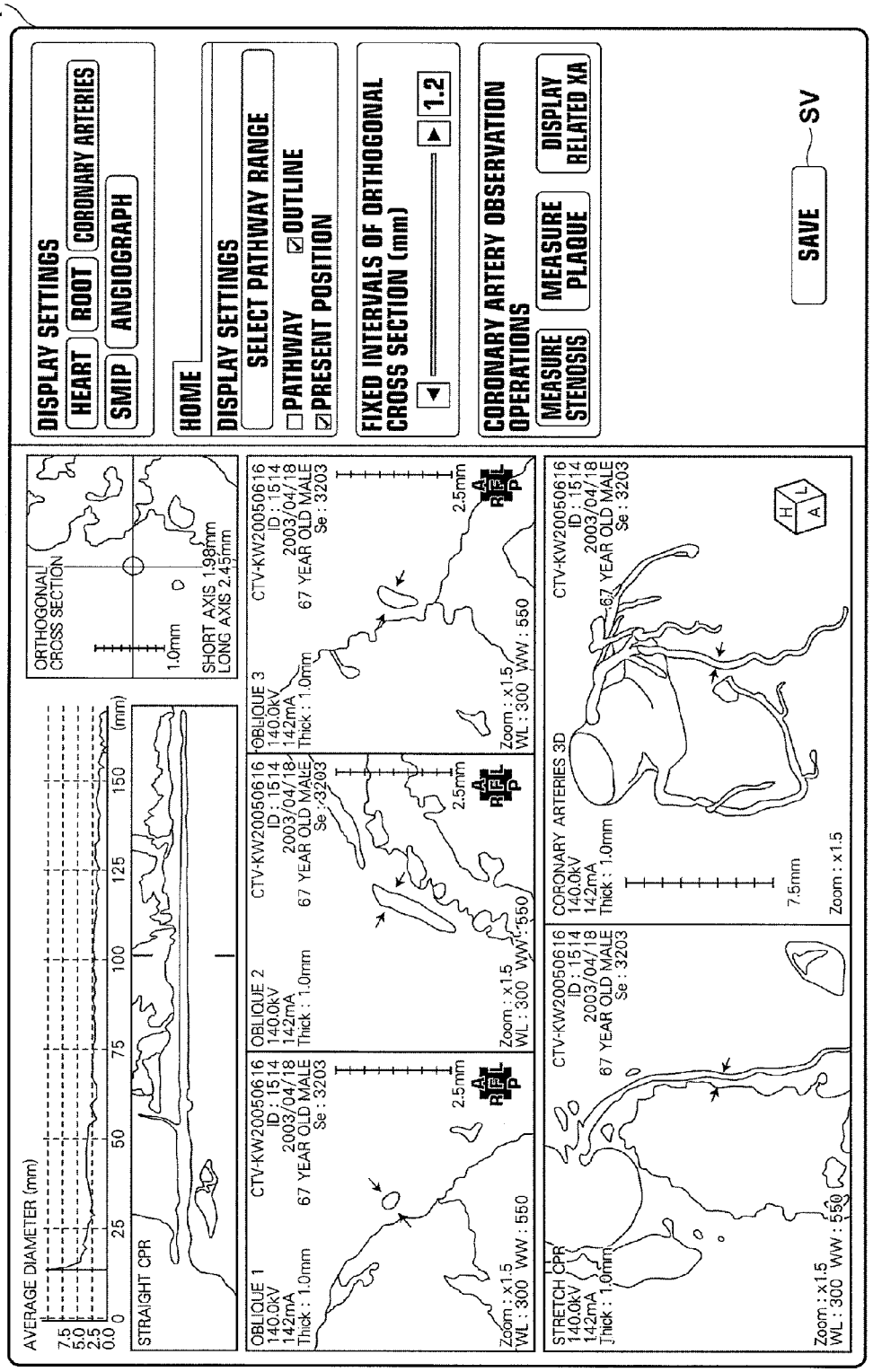
FIG. 2B is a diagram that illustrates an example of a diagnosis screen display.

FIG. 2A and FIG. 2B illustrate examples of diagnosis screens for coronary arteries. FIG. 2A is a diagram that illustrates an image layout of a diagnosis screen 71 which is displayed on the display 7. FIG. 2B is a diagram that illustrates a specific example of the display of the diagnosis screen 71. As illustrated in FIG. 2A, the diagnosis screen is sectioned into an image region IMG, within which a plurality of image windows are arranged, and an operating region OP, in which operating buttons and the like for switching screens and adjusting images are arranged.

A plurality of image windows are arranged within the image region IMG. FIG. 2A illustrates eight image windows, including: a window $W_{GR}$, in which a graph GR that represents the average diameter of the coronary arteries is displayed; a window $W_{ST-CPR}$, in which a straight CPR (Curved Planar Reconstruction) image ST-CPR of the coronary arteries is displayed; a window $W_{MPR-0}$, in which an MPR (Multi Planar Reconstruction) image MPR-0 that represents a orthogonal cross section, windows $W_{MPR-1}$, $W_{MPR-2}$, and $W_{MPR-3}$, in which three MPR images MPR-1, MPR-2, and MPR-3 that respectively represent an axial, sagittal, and coronal cross section are displayed; a window $W_{SC-CPR}$, in which a stretch CPR image SC-CPR is displayed, and a window $W_{VR}$, in which a Volume Rendering image VR is displayed. The diagnostic screen having this layout is that which is illustrated in FIG. 2B.

A label that indicates the relationships among images are displayed along with the images in each window. In FIG. 2B, two arrows that point toward each other are displayed within the images in windows $W_{MPR-1}$, $W_{MPR-2}$, $W_{MPR-3}$, $W_{SC-CPR}$, and $W_{VR}$. These arrows point at the same position within the subject from the same directions. A user can understand the correspondent relationships among cross sections which are displayed as MPR images and a position within the VR image by observing the images while comparing the locations and directions of the arrows.

If one of the image windows within the image region IMG is selected by a clicking operation or the like, the image window is switched to an active state. Thereafter, the display within the image window in the active state is controlled by user operations using the mouse or the like. Meanwhile, the display within the image windows that were not selected is controlled irrelevant to user operations, because the non selected image windows are in an inactive state.

An operation interface including buttons, radio buttons, and the like is arranged within the operating region OP. The operation interface differs according to the target of diagnosis (such as types of organs). However, a save button SV is constantly displayed, regardless of the target of diagnosis. If the save button SV is clicked within the diagnosis screen, an image of the screen which is being displayed at that time is saved as a snapshot.

The data which is stored as the snapshot may be image data that represent an image of the entire display screen. In the present embodiment, analysis data which are obtained during the process of generating the images for observation from the volume data, and the group of parameters which were set when the images which are being displayed were generated are saved as the snapshot.

During the process of generating the images for observation, first, observation targets are extracted by analyzing the volume data. Further, portions that particularly require observation (such as pathologies) within the observation targets, and numerical data, etc. that represent the states of these portions are calculated. The analysis data refer to the results of such analysis. In the aforementioned example, data that represent extracted coronary artery regions, data that represent constricted portions, and data that represent stenosis rates are included in the analysis data. Meanwhile, in order to generate two dimensional images for observation from three dimensional volume data, it is necessary to specify observation formats. The group of parameters include parameters which are necessary to specify observation formats. For example, parameters with respect to CPR images define the ranges which are displayed as CPR images from among extracted coronary artery regions, parameters with respect to MPR images define the positions and orientations of cross sections, and parameters with respect to volume rendering images define the viewpoint of volume rendering, and the like.

When the saved screen is to be reproduced later, each of the images is generated from the volume data using these parameters again, and then the generated images are displayed. According to this saving method, a saved screen can be reproduced in a short time, and thereafter, new images can be displayed by adjusting parameters using the reproduced state as a reference. For example, the orientations of cross sections can be adjusted, and new cross sectional images can be displayed.

Figure 3:
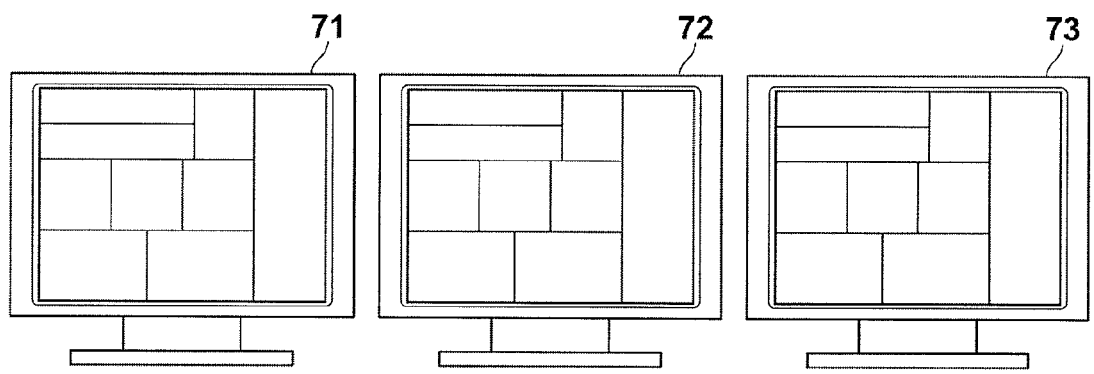
FIG. 3 is a diagram that illustrates a comparative image observation method that utilizes a snapshot function.

Screens which are saved as snapshots can be reproduced at a later time easily by performing predetermined operations, and adjustments are also possible following reproduction. Accordingly, three monitors can be arranged alongside each other as illustrated in FIG. 3, a diagnosis screen 71, in which current images obtained by a most recent examination are arranged, can be displayed on one of the monitors, and diagnosis screens 72 and 73, which are reproduced from snapshots that were saved in the past, can be displayed, and comparative image observation can be performed. However, the number of monitors limits the number of diagnosis screens if this method is employed. In addition, as the number of monitors increases, it becomes difficult for the images to be compared to be within the field of view of a user simultaneously, and frequent movement of line of sight over a wide range will become necessary.

In contrast, the system of the present embodiment adopts a user interface that enables comparative image observation to be performed comfortably even if only one monitor is provided, as will be described below. In the present embodiment, a comparative image observation function is switched ON by settings performed in a setting screen in advance, or by the user performing a predetermined operation while observing images. The user interface when the comparative image observation function is ON will be described with reference to FIG. 4A through FIG. 6.

Figure 4A:
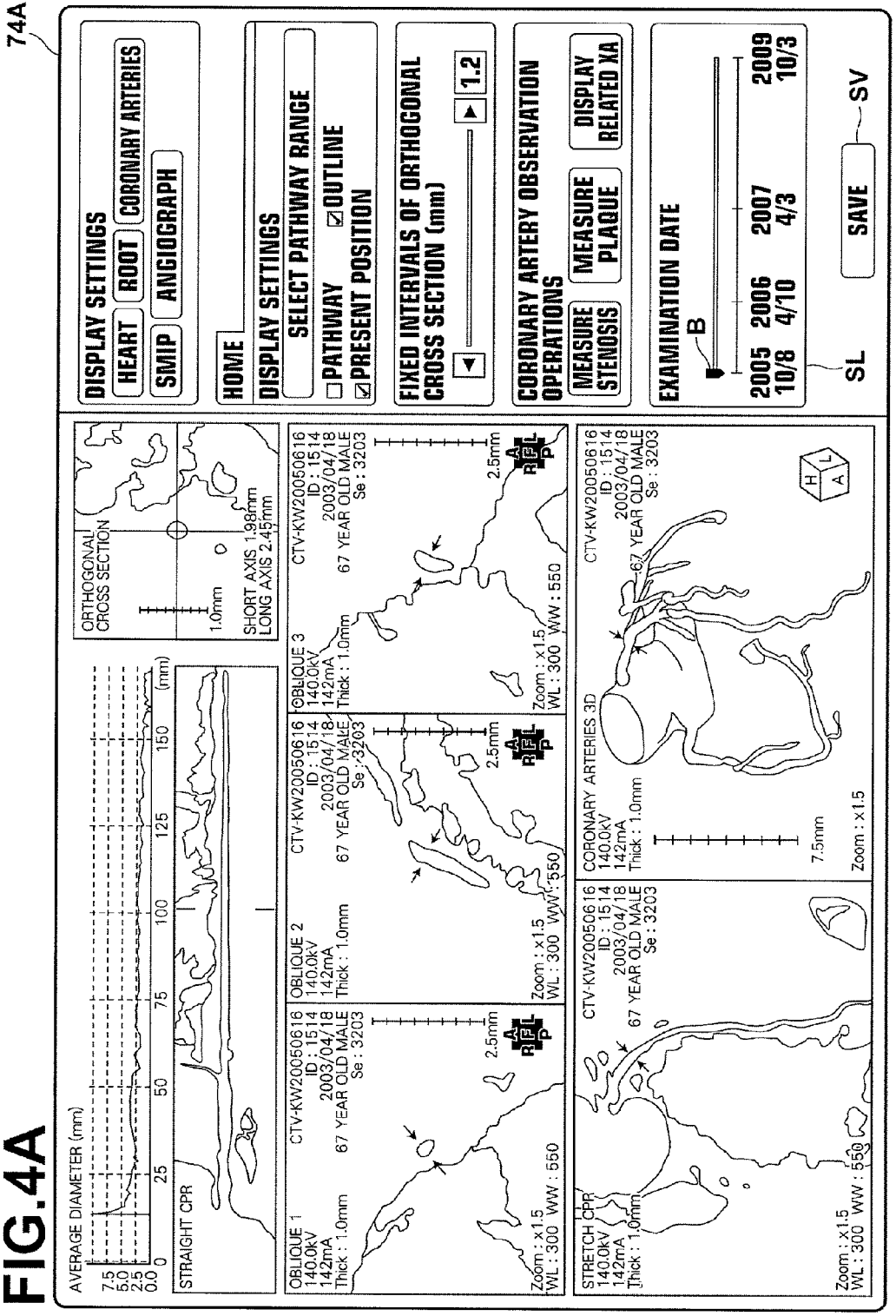
FIG. 4A is a diagram that illustrates the relationship between an operation of a slide bar and a displayed image.

In the system of the present embodiment, when the comparative image observation function is turned ON, a slider SL for specifying a point along a temporal axis is displayed in the operating region OP of a diagnosis screen 74A, as illustrated in FIG. 4A. The starting point of the temporal axis of the slider SL corresponds to the date that a first examination was performed (Oct. 8, 2005 in the example of FIG. 4A). In addition, the endpoint of the temporal axis of the slider corresponds to the date that the most recent examination was performed (Oct. 3, 2009 in the example of FIG. 4A). In an initial state, a slide bar B indicates the starting point of the temporal axis, that is, the date on which the first examination was performed. An image group that represents the state of the subject during the first examination (hereinafter, referred to as "first image group") is displayed within the image region IMG.

Figure 4B:
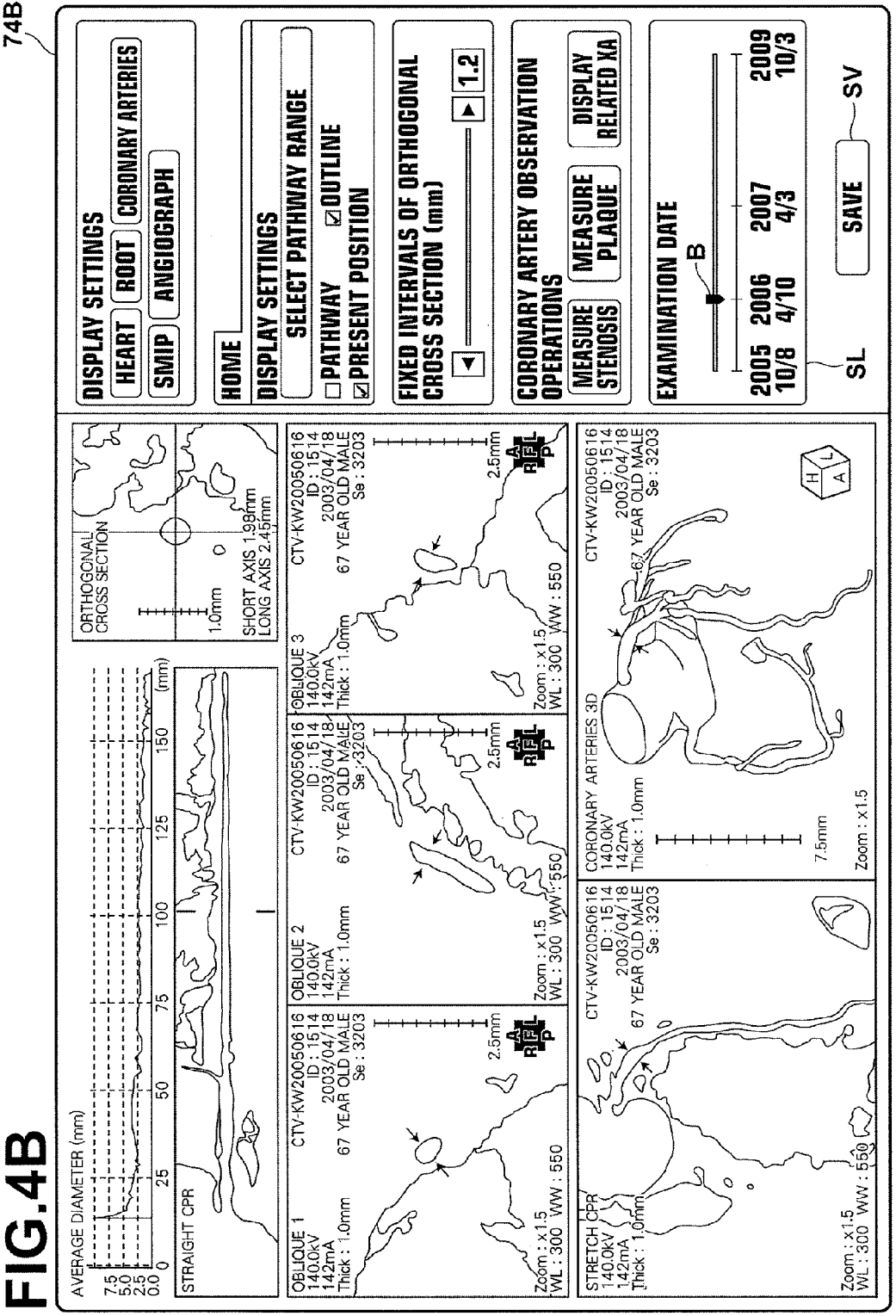
FIG. 4B is another diagram that illustrates the relationship between an operation of the slide bar and a displayed image

FIG. 4B illustrates a diagnosis screen 74B, in which the slide bar B of the slider SL indicates a date on which a second examination was performed (Apr. 10, 2006 in the example of FIG. 4B). At this time, an image group that represents the state of the subject during the second examination (hereinafter, referred to as "second image group") is displayed within the image region IMG. FIG. 4B illustrates an example in which a bump has developed in the vicinity of the origin of the left coronary artery between the first and second examinations, and only this portion has become thicker.

Figure 4C:
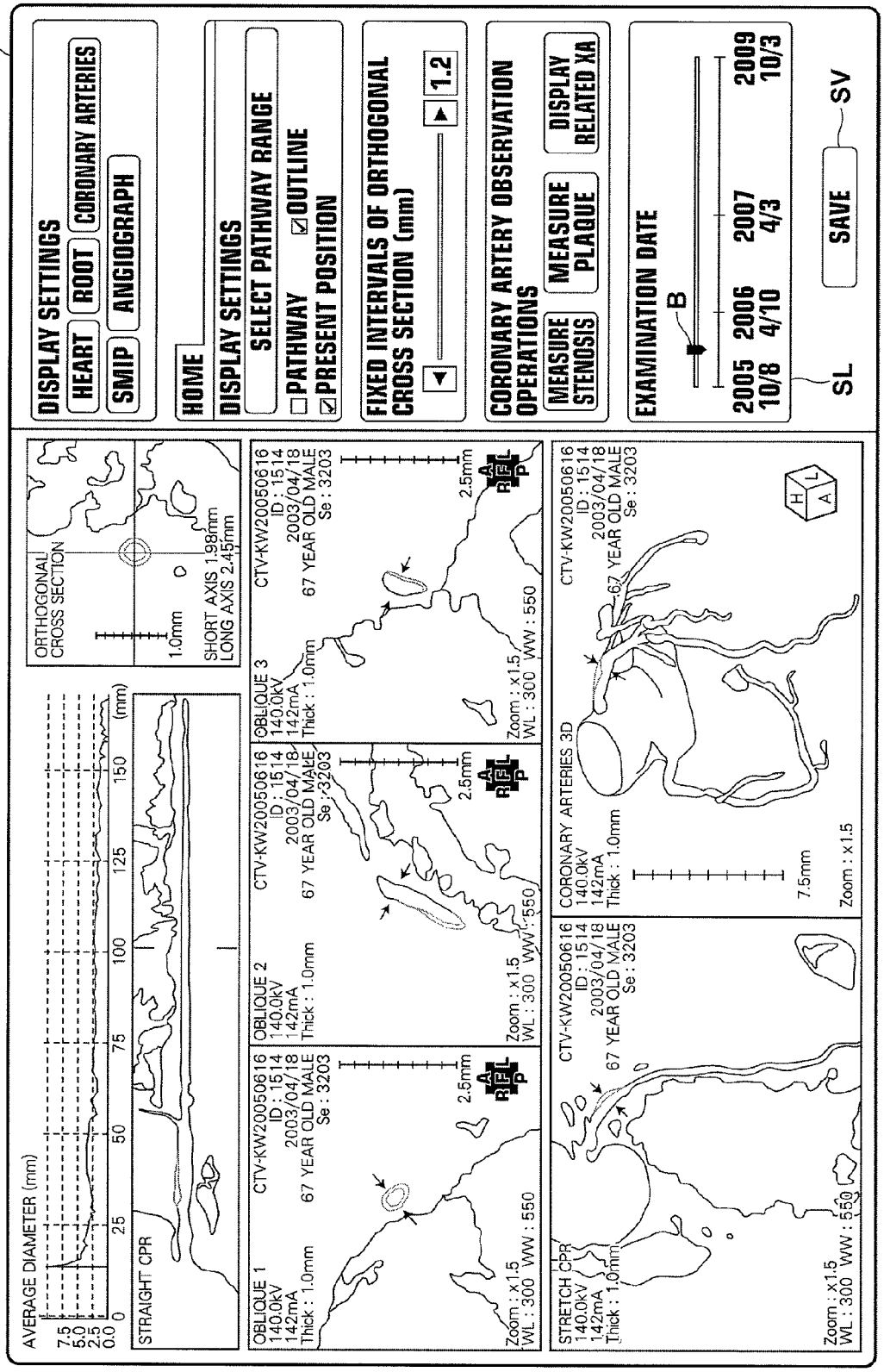
FIG. 4C is yet another diagram that illustrates the relationship between an operation of the slide bar and a displayed image
Figure 5:
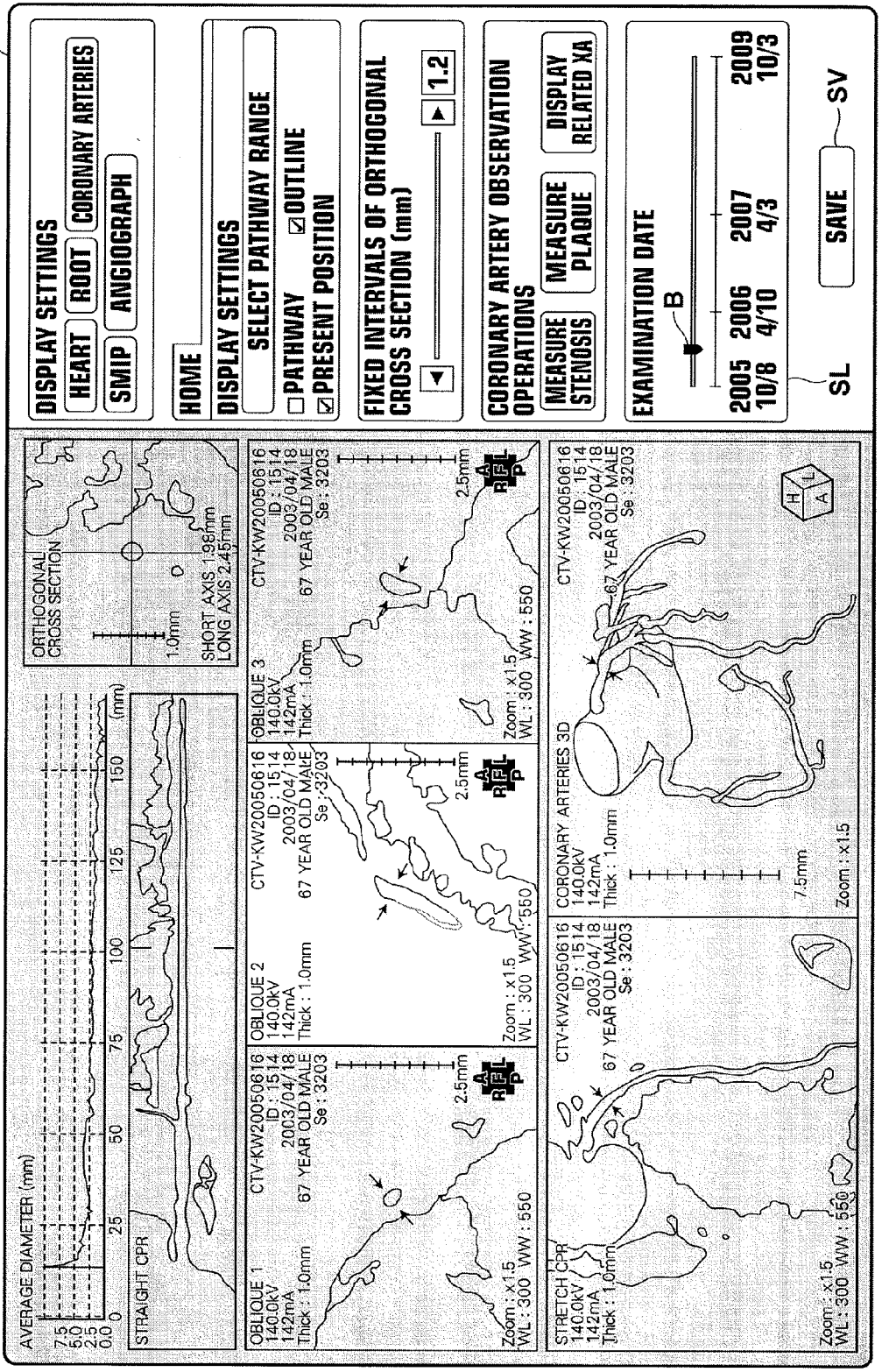
FIG. 5 is a diagram that illustrates another example of a diagnosis screen display.

FIG. 4C illustrates a diagnosis screen 74C, in which the slide bar B of the slider SL is being moved from the date on which the first examination was performed to the date on which the second examination was performed. Note that in the present embodiment, the slide bar B is moved by positioning a cursor on the slide bar B, and by performing a drag and drop operation. Alternatively, the slide bar B may be moved by rotating a mouse wheel while the cursor is positioned on the slide bar B.

In the diagnosis screen 74C, each of the images of the first image group and the second image group are displayed in an overlapped manner within the image region IMG. The transparency of the first image group increases as the slide bar B moves toward the right, and becomes completely transparent when the slide bar B reaches the date on which the second examination was performed. Meanwhile, the second image group does not appear on the screen when the slide bar B is at the starting point of the slider SL (because it is transparent), and the opacity thereof increases as the slide bar B moves toward the right. The second image group completely replaces the first image group when the slide bar B reaches the date on which the second examination was performed.

That is, as an operation to move the side bar B toward the right is performed in the section between the first examination date and the second examination date, the first image group gradually becomes more difficult to view, and the second image group gradually becomes clearer. Conversely, as an operation to move the side bar B toward the left is performed in the same section, the second image group gradually becomes more difficult to view, and the first image group gradually becomes clearer. Similarly, as an operation to move the side bar B toward the right is performed in the section between the second examination date and a third examination date, the second image group gradually becomes more difficult to view, and an image group that represents the state of the subject during a third examination (hereinafter, referred to as "third image group") gradually becomes clearer. Conversely, as an operation to move the side bar B toward the left is performed in the same section, the third image group gradually becomes more difficult to view, and the second image group gradually becomes clearer. Transitions occur in each of the images arranged within the image region IMG in a similar manner in sections beyond the third examination date.

As is clear from a comparison of FIG. 4A and FIG. 4B, if the bump on the coronary artery is not of a significant size, and the change in the thickness of the blood vessel is also not significant, it would be difficult to discriminate the change in the shape of the coronary artery even if the first image group and the second image group are observed side to side. Similarly, in the case that observation is performed while display is switched between the first image group and the second image group, it would be difficult to discriminate the change in the shape of the coronary artery. In contrast, in the diagnosis screen 74C, images that represent a state prior to the change in shape and images that represent a state following the change in shape are displayed in an overlapping manner at the same position. Therefore, even slight changes can be easily discriminated, in the case that any changes occur.

In addition, in the diagnosis screens 74A through 74C, the number of examinations and the intervals between examinations are displayed in the tick marks of the slider SL. Therefore, whether an image being observed is an image obtained at a beginning stage of treatment or an image obtained toward the end of treatment can be easily understood from the tick marks of the slider SL. Further, an image obtained during a desired time period can be easily called up onto the screen, by moving the slide bar B. For this reason, what time period an image which is being displayed was obtained during can be easily understood, even if examinations are performed repeatedly, and there are a great number of different image groups having different examination dates. In addition, physicians can comparatively observe the states of subjects during each time period, while focusing on the same regions of images.

Note that in the diagnosis screen 74C illustrated in FIG. 4C, all of the images displayed within the image region IMG undergo transitions in a coordinated manner in response to the operation of the slide bar B. However, only a portion of the images displayed in the image region IMG may undergo transitions. For example, as in the diagnosis screen 75 of FIG. 5, a configuration may be adopted, wherein the degree of transparency of an image window in an active state (window $W_{MPR-2}$ in the example of FIG. 5) undergoes transitions in a stepwise manner, and images within other image windows in inactive states do not respond to operations of the slide bar B. In the diagnosis screen 75, only the image within the activated image window changes when the slide bar B is operated. Therefore, concentration can be focused on observation of the changing image, without being distracted by movement within other image windows.

Figure 6:
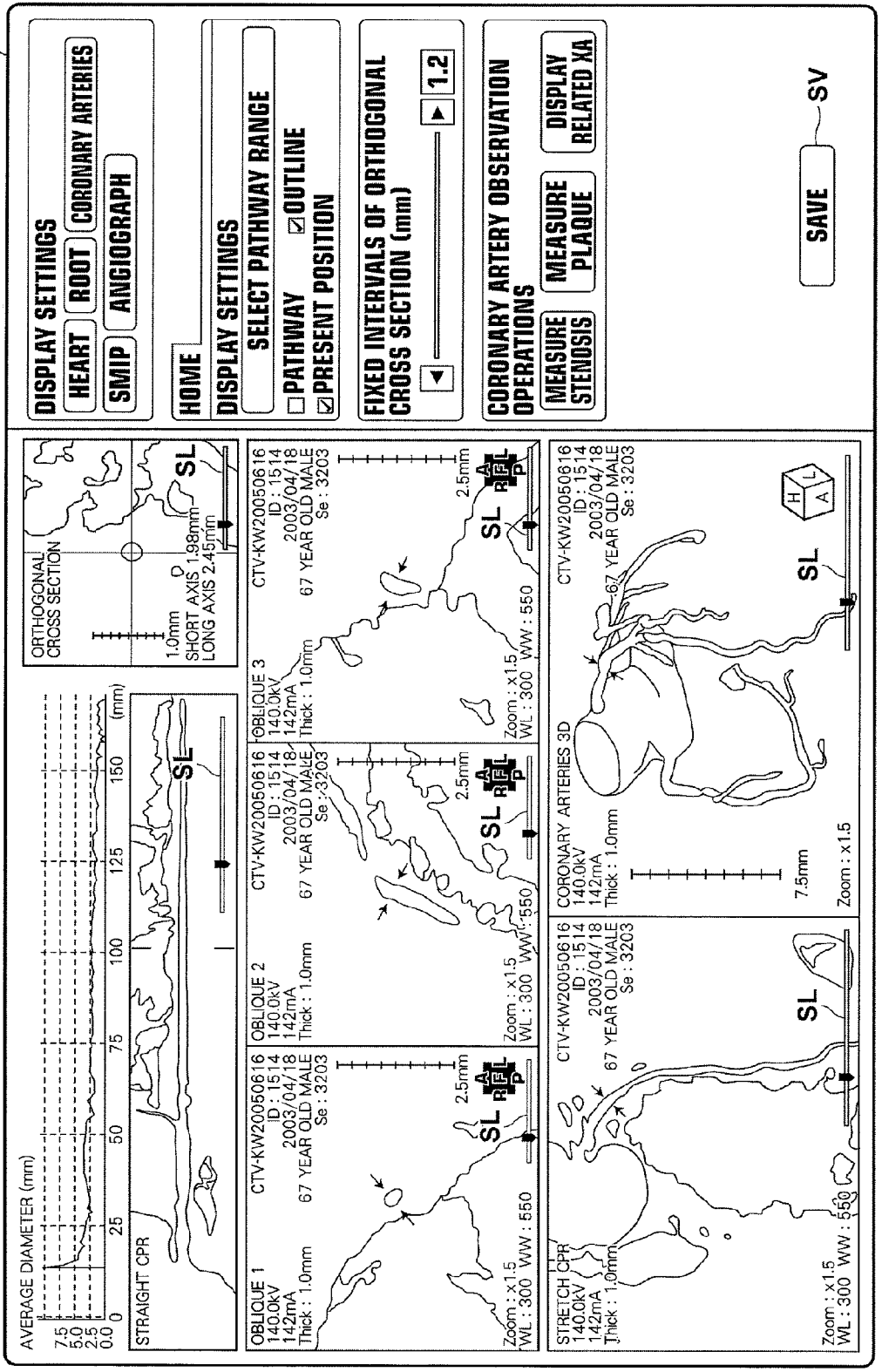
FIG. 6 is a diagram that illustrates yet another example of a diagnosis screen display.

As a further alternative, a slider may be provided in each image window, as in the diagnosis screen 76 illustrated in FIG. 6. In the diagnosis screen 76, an image obtained on a desired examination date, or a layered image constituted by images obtained to two desired examination dates may be displayed in each image window.

The method by which the user interface described above is realized will be clarified, by describing the processes performed by the image window control means 61, the display control means 62, the observation image generating means 64, the client side (C) volume data selecting means 65, and the degree of opacity control means 66 of FIG. 1.

Figure 7:
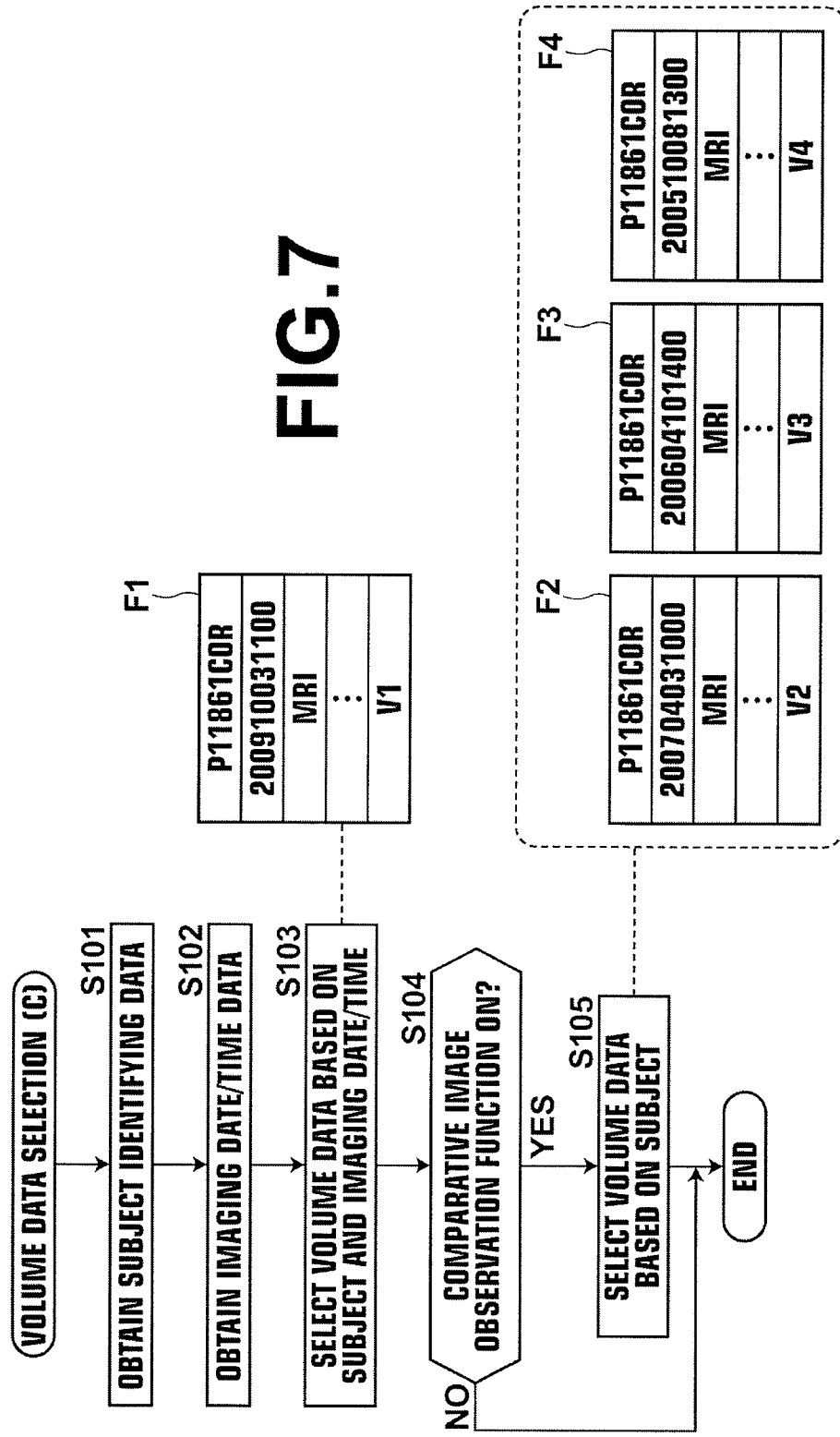
FIG. 7 is a flow chart that illustrates the steps of a process performed by a volume data selecting means (C).

In the present embodiment, first, necessary data is input in an initial screen, then a data selecting process is executed by the volume data selecting means 65. FIG. 7 is a flow chart that illustrates the steps of the process performed by the volume data selecting means 65.

The volume data selecting means 65 causes the aforementioned initial screen and the dialog box to be displayed. Then, the subject identifying data and the imaging date/time data are obtained, by detecting a function selecting operation or an operation that specifies a patient and imaging date/time performed by a user (steps S101, S102).

In the present embodiment, the subject identifying data are combinations of patient ID numbers and symbols that represent bodily portions which are targets of diagnosis. For example, in the case that the ID number of a patient is P11861 and the bodily portion is the coronary arteries represented by symbols COR, the subject identifying data is P11861COR. The patient ID number is input or selected at the initial screen. In addition, the diagnosis assisting functions provided by the present embodiment differ according to the bodily portion which is the target of diagnosis (organs, bones, muscles, blood vessels, etc.). Therefore, the bodily portion which is to be the target of diagnosis is determined by the user selecting a diagnosis assisting function. Accordingly, the subject identifying data can be obtained, by detecting the function selecting operation and an operation that specifies a patient.

In the present embodiment, the imaging date/time data is a 12 digit numerical value that represents the imaging date (year in AD, month, and day) and the imaging time (hour, minute, and second). This numerical value is input or selected by the user in the aforementioned dialog box.

Next, the volume data selecting means 65 selects volume data to be employed to generate images for observation, based on the subject identifying data and the imaging date/time data (step S103). Specifically, the subject identifying data and the imaging date/time data are sent to the volume data selecting means 42 of the data server 4, and a search is requested among the files stored in the high capacity storage 5.

The volume data selecting means 42 selects files to which subject identifying data and imaging date/time data having the same values as the received subject identifying data and the imaging time/date data, from among the stored file groups. FIG. 7 illustrates an example in which a file F1 having subject identifying data of P11861COR, imaging date/time data of 200910031100, and modality data that represents an imaging modality of MRI is selected.

Thereafter, the volume data selecting means 65 judges whether the comparative image observation function is ON (step S104). Whether the comparative image observation function is ON may be judged by referring to setting flags stored in the memory for each function (flags that take a value of 1 when the function is ON, and take a value of 0 when the function is OFF), for example.

In the case that the comparative image reading function is ON, the volume data selecting means 65 again selects volume data sets to be employed to generate images for observation, based on the subject identifying data (step S105). The sets of volume data are selected by requesting that the volume data selecting means 42 search for files that include pertinent volume data, in a manner similar to that employed in step S103. However, in step S105; the imaging date/time data is not sent when requesting the search. Thereby, a plurality of sets of volume data regarding the specified subject and obtained on different imaging dates and times are selected.

FIG. 7 illustrates an example in which files F2, F3, and F4, having 200704031000, 200604101400, and 200510081300 appended respectively thereto as imaging date/time data are selected. Meanwhile, in the case that the comparative image observation function is OFF, the process of step S105 is not executed.

The sets of volume data which are selected in step S105 are sets of volume data which are obtained on different examination dates, as in the example of FIG. 7. However, there are cases in which sets of volume data which are obtained at different times on the same examination date are included in the selected sets of volume data. This is because a plurality of sets of volume data are obtained during a single examination, in an examination in which a plurality of imaging operations are performed at predetermined temporal intervals following ingestion of imaging agents, for example.

Next, the processes performed by the observation image generating means 64, the layered image generating means 63 and the display control means 62 will be described with reference to FIG. 8.

In the present embodiment, the observation image generating means 64 is equipped with: a managing section (not shown) that manages the entirety of the image generating processes; an analyzing section 640; a straight CPR image generating section 641; an MPR image generating section 642; a stretch CPR image generating section 643; and a VR image generating section 644. In other words, the programs that define the processes which are executed by the observation image generating means 64 include: a main program; and a plurality of program module groups that respectively define an analyzing process, a straight CPR image generating process, an MPR image generating process, a stretch CPR image generating process, and a VR image generating process.

The sets of volume data selected by the volume data selecting means 65 are supplied to the analyzing section 640 of the observation image generating means 64. The analyzing section 640 is equipped with a plurality of types of analyzing functions, and determines the types of analyzing processes to be executed, based on user operations and data recorded in the header regions of the files supplied thereto. For example, in the case that a diagnosis assisting function with respect to coronary arteries is selected, and data regarding the use of an imaging agent or the like is recorded in the header region of the selected files, a process for extracting coronary artery regions will be executed as an analyzing process. Further, stenosis rates may be derived and bumps may be detected, by analyzing cross sections of each portion of the coronary arteries. On the other hand, in the case that a fat analyzing function is selected, for example, a process for extracting fat regions may be executed, and further, calculation of body fat ratio and the like may be performed.

Figure 8:
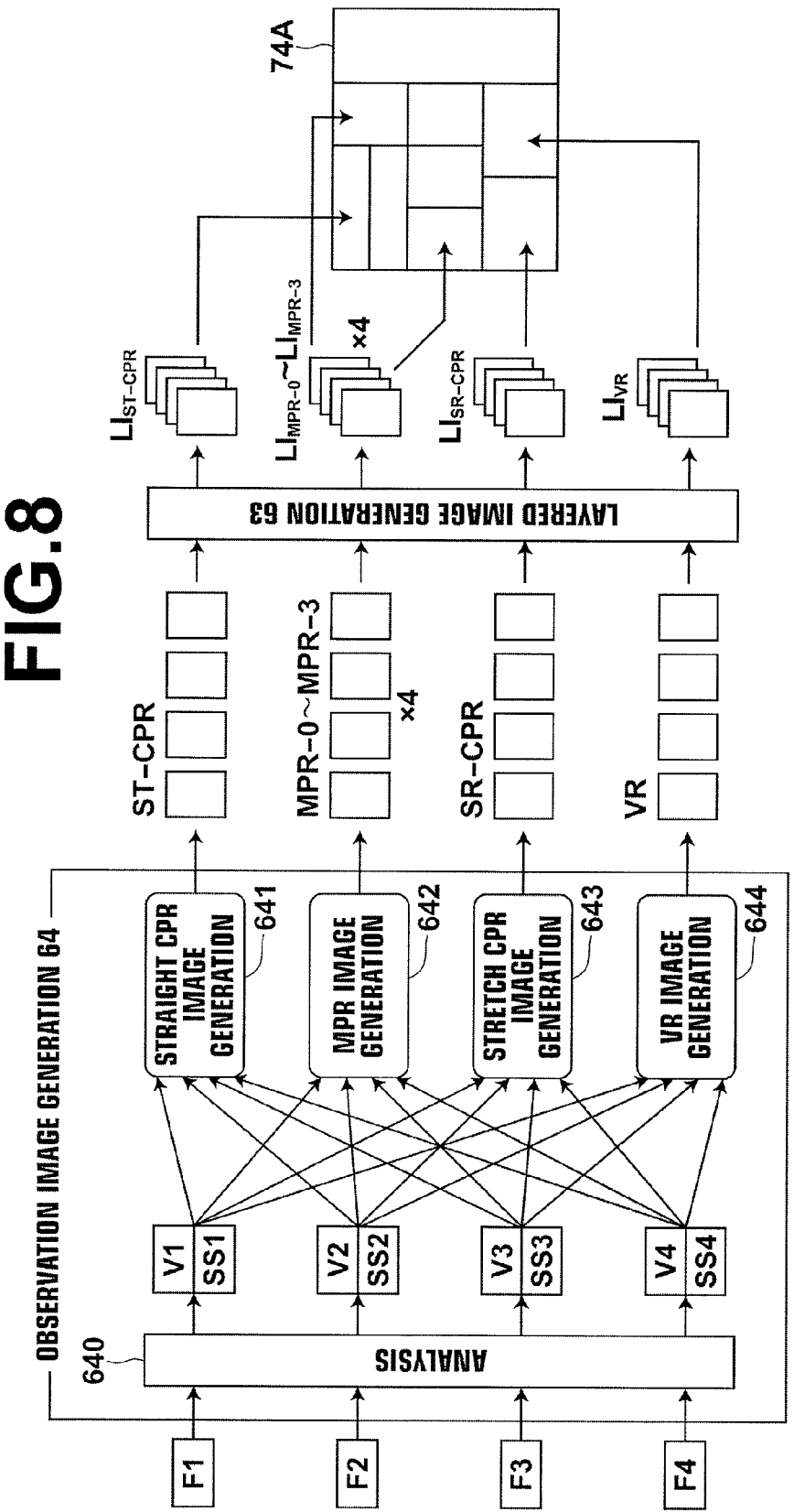
FIG. 8 is a diagram that illustrates the schematic structure of an observation image generating means, a layered image generating means, and a process performed by a display control means.

FIG. 8 illustrates an example in which the files F1 through F4 of FIG. 7 are supplied to the analyzing section 640. The analyzing section 640 extracts a coronary artery region from a set of volume data V1 included in the supplied file F1. Similarly, coronary artery regions are extracted from sets of volume data included in the files F2, F3, and F4.

Hereinafter, a description will be given of an example in which a diagnosis assisting function with respect to coronary arteries is selected. In the present embodiment, the coronary arteries are extracted by the method disclosed in Japanese Patent Application No. 2009-069895. In this method, first, a rectangular parallelepiped region that includes the cardiac region is set as a search range. Next, linear structures which are included in the search range are searched for based on a predetermined algorithm. Further, points which are estimated to be points along the cores of coronary arteries are detected, based on the linear structures detected by the search. In the following description, the points which are estimated to be points along the cores of coronary arteries will be referred to as candidate points or nodes.

The search for the linear structures is performed by calculating unique values of a 3×3 Hessian matrix for each local region within the search range. In regions that include linear structures, one of the three unique values of the Hessian matrix becomes a value close to zero, while the other two values will be relatively greater values. In addition, the unique vector that corresponds to the unique value close to zero indicates the direction of the main axis of the linear structures. In the coronary artery extracting process 14, this relationship is utilized to judge likelihoods of being linear structures based on the unique values of a Hessian matrix for each local region. In local regions in which linear structures are discriminated, the center points thereof are detected as candidate points.

Next, the candidate points which are detected by the search are linked based on a predetermined algorithm. Thereby, tree structures constituted by the candidate points and blood vessel branches (edges) that connect the candidate points are constructed. The coordinate data of the detected plurality of candidate points and vector data that represent the directions of the blood vessel branches are stored in the memory, along with identifiers for the candidate points and the blood vessel branches. Next, the shapes of the coronary arteries are discriminated in detail based on the values of the surrounding voxels (CT values) for each detected candidate point. More specifically, the outlines (the outer walls of the blood vessels) of the coronary arteries are discriminated within cross sections perpendicular to the pathways of the coronary arteries. The discrimination of shapes is performed employing a known segmentation method, such as the Graph Cuts method. Data necessary to specify the extracted coronary artery regions are generated by the above processes.

Further, the analyzing section 640 performs various analyzing processes to obtain data necessary to diagnose the coronary arteries with respect to the coronary artery regions, which have been extracted as tree structures. For example, the analyzing section 640 detects portions at which stenosis is present, calculates stenosis rates, detects calcified regions, measures the sizes of the calcified regions, detects bumps on the coronary arteries, and measures the sizes of the bumps. However, these analyzing processes may be executed only when users perform predetermined operations.

The analysis results are output correlated with the sets of volume data, as analysis data that constitute the snapshots. In the present embodiment, the identifiers and the positional coordinates of the candidate points, the identifiers of each blood vessel branch and correlations among the candidate points positioned at the ends of the blood vessel branches are output as the analysis data. The sets of volume data and the snapshots may be output recorded into a single file, or may be recorded into separate files and output along with data that indicates the correlations among the files.

Note that the sets of volume data included in the files F1 through F4 are data obtained on different examination dates. Therefore, there are cases in which the shapes of extracted regions partially differ, due to influence of respiration and changes in symptoms of disease. For example, between states in which a bump is present and in which a bump is not present on a coronary artery, the core line of the blood vessel shifts due to a difference in the thickness of the blood vessel, and there are cases in which different points are detected as candidate points.

However, substantially the same points are detected as the candidate points within regions at which temporal changes have not occurred. Therefore, matching of the tree structures can be performed, by employing the candidate points within regions at which temporal changes have not occurred as references.

In the present embodiment, the analyzing section 640 calculates the degrees of similarity of main nodes based on a predetermined evaluation function, and correlates candidate points having the highest degrees of similarity to each other.

Then, the correspondent relationships among the other candidate points are estimated, based on the correspondent relationships among the main nodes of the tree structures. According to this method, the same anatomical points can be correlated to each other, even if the shapes of the coronary artery regions extracted from each set of volume data differ. Note that various other methods for correlating anatomic structures by graph matching have been proposed, as disclosed in U.S. Pat. No. 7,646,903.

A positioning method that utilizes structures unique to the coronary arteries has been described above. However, the positioning may be performed by the method disclosed in U.S. Pat. No. 7,620,229, or by any other known method. In the present embodiment, the analyzing section 640 is equipped with various types of positioning functions, and realizes accurate positioning, by selectively employing these functions according to the tissue which is the target of diagnosis.

The image generating sections 641 through 644 generate a plurality of images for observation that represent the states of the subject during different time periods (on different examination dates) from the sets of volume data V and the snapshots output from the analyzing section 640. For example, the straight CPR image generating section 641 generates a straight CPR image STR-CPR1 that represents the state of the coronary arteries on Oct. 3, 2009 using the set of volume data V1 included in the file F1 and a snapshot SS1 that includes analysis results of the set of volume data V1. Similarly, the straight CPR image generating section 641 generates a straight CPR image STR-CPR2 that represents the state of the coronary arteries on Apr. 3, 2007 from the file F2, a straight CPR image STR-CPR3 that represents the state of the coronary arteries on Apr. 10, 2006 from the file F3, and a straight CPR image STR-CPR4 that represents the state of the coronary arteries on Oct. 8, 2005 from the file F4.

The MPR image generating section 642 generates four orthogonal cross sectional images MPR-0, four axial cross sectional images MPR-1, four sagittal cross sectional images MPR-2, and four coronal cross sectional images MPR-3, corresponding to the files F1 through F4. Similarly, the stretch CPR image generating section 643 and the VR image generating section 644 generate four stretch CPR images SR-CPR and four volume rendering images VR corresponding to the files F1 through F4. Note that as methods for generating CPR images, MPR images and the like are known, and therefore, specific descriptions of the processes executed by each of the image generating sections will be omitted.

FIG. 11 is a flow chart that illustrates the steps of a process performed by a main program of the observation image generating means 64. FIG. 11 illustrates the steps of a process which are performed after the analyzing section 640 has extracted the coronary artery regions. When the processes executed by the analyzing section 640 are completed, the main program initially sets initial parameters to be supplied to the image generating sections 641 through 644 (step S201). The values of each parameter are added to the snapshots output from the analyzing section 640. At this time, the values of the parameters are recorded in the snapshots as variable data, and are updated when a user clicks the aforementioned save button SV.

The parameters necessary for the processes of the image generating sections 641 through 644 differ for each image generating section, that is, for each observation format of the images to be generated. For example, parameters that specify ranges of display in the path directions of the coronary arteries are supplied to the straight CPR image generating section 641 and the stretch CPR image generating section 643. In addition, parameters that specify the positions and orientations of cross sections are supplied to the MPR image generating section 642. Further, parameters that specify the position of a viewpoint and the like are supplied to the VR image generating section 644.

In step 201, the initial values of the parameters to be supplied to the image generating sections 641 through 644 are default values stored in the memory in advance, or values which are set in advance by the user.

Note that in the case that a plurality of images of the same type are to be displayed on the diagnosis screen, a plurality of values are set for a single type of parameter. For example, as illustrated in FIGS. 4A through 4C, MPR images are displayed for each of an orthogonal cross section, an axial cross section, a sagittal cross section, and a coronal cross section. Therefore, four sets of values are supplied to the MPR image generating section 642 as parameters that specify the cross sections. Next, each image for observation is generated according to the parameter values which have been set in step S201 (Step S202).

Each of the image generating sections 641 through 644 stores the generated images for observation as files in predetermined formats in the memory. At this time, data which was recorded in the header regions of the files employed to generate the images are copied into the header regions of the newly stored files. The image generating sections 641 through 644 further records information regarding the observation format of the images (image type, parameters, etc.) in the header regions of the stored files. Thereby, the generated images are correlated with information regarding the subject, the imaging date/time, the modality, and the observation format, and it becomes possible to search for images for observation based on imaging dates/times, and to rearrange the images for observation.

If an operation that requests a change in the observation format of the images for observation is detected in the diagnosis screen (step S203), each of the parameters are reset in response to the user operation (step S204). The image generating sections 641 through 644 reprocesses the sets of volume data which have been read out previously according to the changed parameter values, to generate images for observation again (step S202). For example, in the case that a user performs an operation to change the direction of line of sight (an operation to rotate images), images that view the subject from a different direction are generated.

Note that in step S203, operations for changing the types of images may be received as operations to change the observation format, in addition to operations to change parameters, such as directions of lines of sight. For example, the observation image generating means 64 may further comprise an MIP (Maximum Intensity Projection) image generating section in addition to the image generating sections 641 through 644, and an operation to change a displayed MPR image to an MIP image may be received at step S203. In this case, the MIP image may be generated instead of the MPR image at step S202.

Hereinafter, a description will be given with reference to FIG. 8 and FIG. 10. The layered image generating means 63 classifies the images f observation stored in the memory by the image generating sections 641 through 644 by observation format based on data within the file headers, and arranges the images based on the imaging dates/times thereof. Then, the layered image generating means 63 generates layered images $LI_{ST-CPR}$, $LI_{MPR-1}$, $LI_{MPR-2}$, $LI_{MPR-3}$, $LI_{SC-CPR}$, and $LI_{VR}$, by layering the images for observation in each observation format in descending order (or ascending order) of the imaging dates/times thereof. Note that when the images for observation are updated by the observation image generating means 64, the layered images are updated by the layered image generating means 63 as well.

For example, a straight CPR image STR-CPR1 that represents the coronary arteries on Oct. 3, 2009 is arranged as layer 1, a straight CPR image STR-CPR2 that represents the coronary arteries on Apr. 3, 2007 is arranged as layer 2, a straight CPR image STR-CPR3 that represents the coronary arteries on Apr. 10, 2006 is arranged as layer 3, and a straight CPR image STR-CPR4 that represents the coronary arteries on Oct. 8, 2005 is arranged as layer 4 in an image having a layer structure with a plurality of layers, as illustrated in FIG. 10.

At this time, the layered image generating means 63 utilizes the analysis data included in the snapshots, to perform positioning of the straight CPR images STR-CPR1, STR-CPR2, STR-CPR3, and STR-CPR4. For example, in the case that each of the straight CPR images is an image that represents a path having a node N1 of a tree structure as a starting point and a node N4 of the tree structure as an endpoint, the images are arranged such that points corresponding to the node N1 in each of the straight CPR images are positioned at the same position within a coordinate system common to the layers 1 through 4. Further, the images are arranged such that points corresponding to nodes N3 and the nodes N4 are positioned at the same position within the coordinate system common to the layers 1 through 4. The layered image $LI_{ST-CPR}$ is generated in this manner.

Note that in cases that the distances among nodes differ among images due to differences in imaging magnification rates or the like, a predetermined normalizing process is administered with respect to the straight CPR images prior to positioning. Alternatively, the observation image generating means 64 may perform the normalizing process in advance.

After the layered images are generated, the layered image generating means 63 initially sets the degree of opacity for each layer. In the present embodiment, the degree of opacity of the layer in which the image having the earliest examination date as judged from the data in the file header (layer 4 in the example of FIG. 10) is set to 100%, and the degrees of opacity of the other layers are set to 0%.

The image window control means 61 arranges the image windows $W_{GR}$, $W_{ST-CPR}$, $W_{MPR-0}$, $W_{MPR-1}$, $W_{MPR-2}$, $W_{MPR-3}$, $W_{SC-CPR}$, and $W_{VR}$ in the image region IMG. The plurality of image windows may be arranged alongside each other as exemplified in the figures, or movable image windows may be arranged to overlap each other. In addition, the image window control means 61 controls switching of each of the image windows from an active state and an inactive state.

The display control means 62 outputs layered images $LI_{ST-CPR}$, $LI_{MPR-0}$, $LI_{MPR-1}$, $LI_{MPR-2}$, $LI_{MPR-3}$, $LI_{SC-CPR}$, and $LI_{VR}$, to the image windows $W_{ST-CPR}$, $W_{MPR-0}$, $W_{MPR-1}$, $W_{MPR-2}$, $W_{MPR-3}$, $W_{SC-CPR}$, and $W_{VR}$ respectively. However, during initial display, the degrees of opacity of the layers of the layered images other than layer 4 are set to 0%. Therefore, only images that represent the subject as imaged on Oct. 8, 2005 appear on the screen. That is, the diagnosis screen 74A of FIG. 4A appears on the display 7.

In addition to outputting the layered images to the image windows, the display control means 62 monitors signals from input devices, such as a mouse, to detect operations to move a point along the temporal axis. That is, the display control means 62 detects operations that specify or change dates within a period from a first examination date to the most recent examination date. The specified dates are detected as coordinate values that represent the position of the slide bar B, or as a number of rotations of a mouse wheel. The display control means changes the degree of opacity of each layer that constitutes the layered images, based on the detected operations.

The degree of opacity of each layer that constitutes the layered images is defined for each layer by an opacity curve, in which the horizontal axis represents time and the vertical axis represents the degree of opacity (%). Selection (determination) of the opacity curve is performed by the degree of opacity control means 66.

FIG. 12A is a diagram that illustrates the opacity curve for the layer in which the image obtained on the first examination date is arranged (layer 4). FIG. 12B is a diagram that illustrates the opacity curve for the layer in which the image obtained on a second examination date is arranged (layer 3). FIG. 12C is a diagram that illustrates the opacity curve for the layer in which the image obtained on a third examination date is arranged (layer 2). FIG. 12A is a diagram that illustrates the opacity curve for the layer in which the image obtained on a fourth examination date is arranged (layer 1).

The degrees of opacity for layers 1 and 2 are set to 0 within a section from the first examination date to the second examination date. Accordingly, only the images of layers 3 and 4 appear on the screen. The degree of opacity of the image of layer 4 decreases monotonously within this section. Conversely, The degree of opacity of the image of layer 3 increases monotonously within this section. In addition, the degree of opacity of each layer increases and decreases such that the total of the degrees of opacity of two layers is constantly 100%. As illustrated in the figures, the degree of opacity curves are defined in a similar manner within the section from the second examination date to the third examination date, and within the section from the third examination date to the fourth examination date.

That is, in the present embodiment, the degree of opacity curve of each layer is defined such that the degree of opacity assumes a maximum value at the imaging date/time correlated with the image for observation arranged at that layer (the imaging date/time recorded in the header of the image for observation) and such that the value becomes smaller as the date becomes farther from the imaging date/time correlated to the images for observation. In addition, the layered image is constituted by four layers, but the degree of opacity curves are defined such that the degree of opacity of one or two images for observation is a value greater than 0% at any section along the temporal axis, and 0% for other images for observation. That is, the degree of opacity of each layer is defined such that three or more images are not displayed in an overlapping manner.

Figure 13:
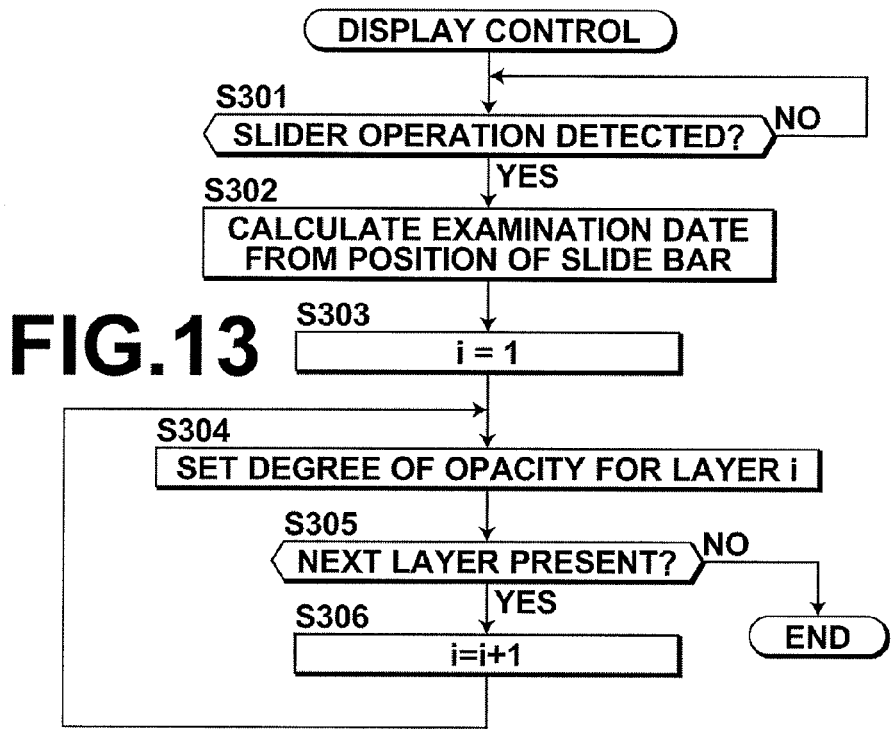
FIG. 13 is a flow chart that illustrates the outline of a display control process.

FIG. 13 is a flow chart that illustrates the steps of a process performed by the display control means 62. When the an operation of the slider SL is detected (step S301), the display control means 62 calculates a specified examination date from the position of the slide bar B (step S302). Next, a number i of a processing target layer is initially set to 1 (step S303), and the degree of opacity of the processing target layer i (layer 1 in this case) is set based on the degree of opacity curve. In the case that there is a subsequent layer (step S305), the number i of the processing target layer is incrementally increased (step S306), and the degree of opacity of the processing target layer i (layer 2 in this case) is set based on the degree of opacity curve. Thereafter, steps S304 through S306 are repeated until there are no more processing target layers (step S305). Thereby, the degree of opacity of each layer that constitutes the layered images $LI_{ST-CPR}$, $LI_{MPR-0}$, $LI_{MPR-1}$, $LI_{MPR-2}$, $LI_{MPR-3}$, $LI_{SC-CPR}$, and $LI_{VR}$ is set.

In the settings illustrated in FIGS. 12A through 12D, the image obtained on the first examination date, which is displayed in an initial state, gradually becomes more transparent, and the image obtained on the second examination date gradually becomes more opaque as the slide bar B is moved from the leftmost end toward the right. When the image obtained on the first examination date completely disappears, only the image obtained on the second examination date is displayed on the screen. If the slide bar B is moved further to the right, the image obtained on the second examination date gradually becomes more transparent, and the image obtained on the third examination date gradually becomes more opaque. Thereafter, images obtained on different examination dates disappear and appear in a similar manner. In addition, when the slide bar B is moved toward the left, the images disappear and appear in an order reverse that from when the slide bar B is moved toward the right. Thereby, the user interface described with reference to FIGS. 4A through 4C is realized.

The degree of opacity curves illustrated in FIGS. 12A through 12D enable simple calculation of the degree of opacity of each layer from the point along the temporal axis and the relationship between two examination dates that the point is in between, because the degree of opacity linearly increase or decrease between the examination dates, and the total degree of opacity of two layers is 100%. That is, complex control processes are not necessary to change the degrees of opacity of the layers. Therefore, the diagnosis screen can be updated expediently in response to user operations. Alternatively, the degree of opacity curves may increase or decrease parabolically instead of linearly. In addition, the degrees of opacity of two layers may be independently controlled, and not correlated to each other. In addition, the degree of opacity of each layer may be calculated during the display control process, or by referring to a table, in which dates and degrees of opacity are correlated.

Note that in the example described above, the degrees of opacity are controlled such that the number of layers (that is, images for observation) of which the degree of opacity assume values greater than 0% is two or less. However, the degrees of opacity may be determined such that the degrees of opacity of three or more layers assume values of greater than 0%, in cases that the state of the subject at a certain point in time is to be compared against the state of the subject on two examination dates prior to and following the point in time, for example.

The processes performed by the display control means and the degree of opacity control means 66 have been described above. In the present embodiment, the process executed by the display control means may be switched to the processes described below, by settings set at the setting screen, or by menu operations. Hereinafter, cases in which the process executed by the display control means 62 is set to "lattice display", "stereoscopic display", and "morphing display" will be described.

First, a case in which the process to be executed by the display control means 62 is set to "lattice display" will be described. In this setting, the display control means 62 displays an image group that represents the state of an examination date in the image region IMG of the previously described diagnosis screen when the slide bar B indicates a date on which the examination was performed. For example, if the slide bar B indicates Oct. 8, 2005, the aforementioned first image group is displayed, and if the slide bar B indicates Apr. 10, 2006, the aforementioned second image group is displayed.

Figure 14:
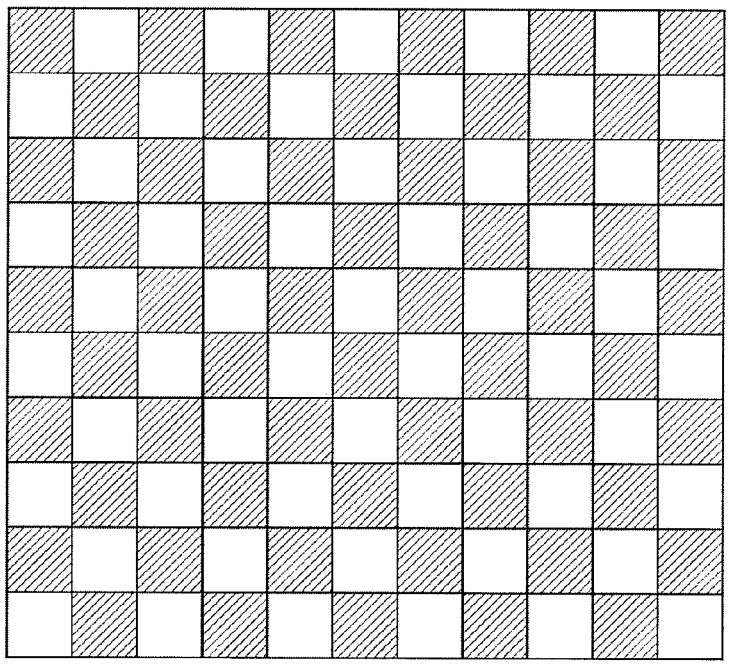
FIG. 14 is a diagram that illustrates an example of display of an image window displayed as a lattice.

Meanwhile, if the slide bar B indicates a point in time other than an examination date, the display control means 62 selects two layers from among the layers that constitute the layered images, based on the position of the slide bar B. If the slide bar B is between a certain examination date and a following examination date, the layers that correspond to the examination dates at the two ends of the section are selected. Then, display is controlled such that the windows W within the image region IMG are sectioned into lattices, and the images for observation of the selected layers are alternately arranged in the two groups of regions (the hatched regions and the non hatched regions) as illustrated in FIG. 14. Thereby, an image, in which one of the images for observation is masked by the other image for observation in the form of a lattice, is displayed. For example, in the case that the slide bar is positioned between Oct. 8, 2005 and Apr. 10, 2006, the images obtained on the first examination date are displayed in the hatched regions, and the images obtained on the second examination date are displayed in the non hatched regions.

If two images for observation are arranged alternately in the sections of a lattice, the display on the screen will appear as though a single image is being displayed, if the two images for observation are completely the same. Accordingly, if no changes have occurred between the first examination date and the second examination date, the lattice pattern will not be discriminated by the eyes of users. In contrast, if there are portions of the images for observation that differ, the display within adjacent sections will be shifted at these portions. As a result, the lattice pattern will be clearly discriminated by the eyes of users at these portions.

Figure 15A:
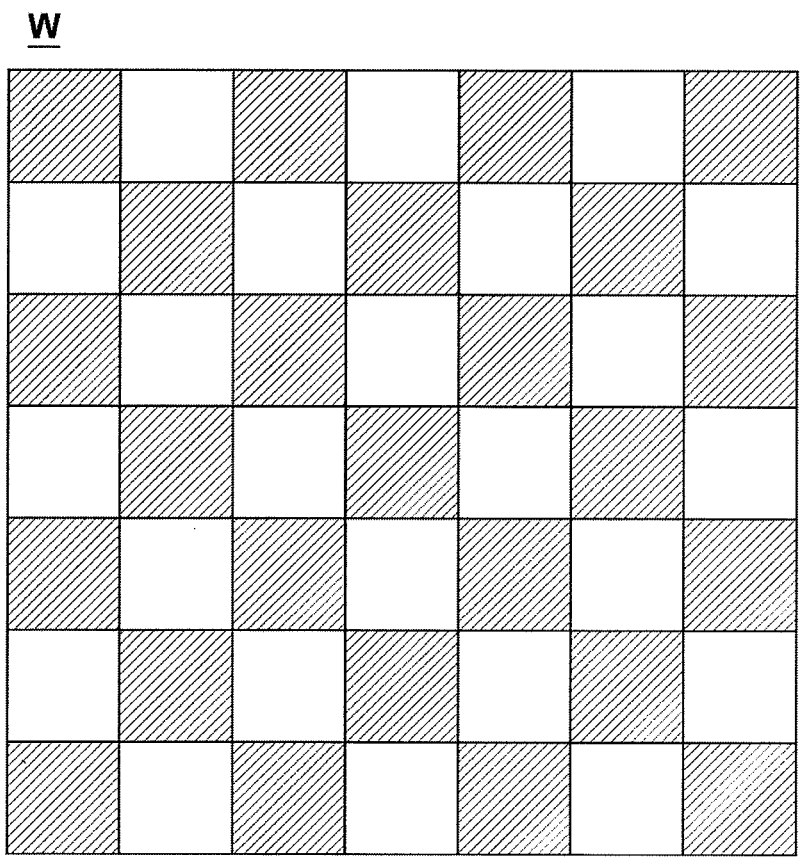
FIG. 15A is a diagram that illustrates a modification of lattice sections.

In the present embodiment, the sectioning into the lattice can be varied by predetermined operations. For example, the number of sections can be decreased to enlarge the size of individual sections, as illustrated in FIG. 15A, or the number of sections can be increased to reduce the size of individual sections. In addition, the boundaries among sections may be moved in a parallel manner, as illustrated in FIG. 15B.

Figure 16A:
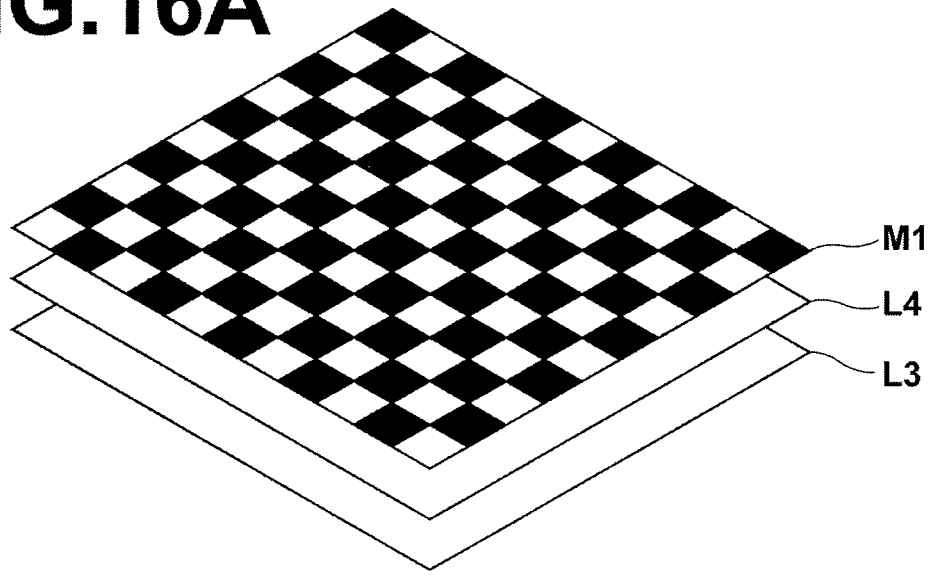
FIG. 16A is a diagram for explaining how lattice display is realized.
Figure 16B:
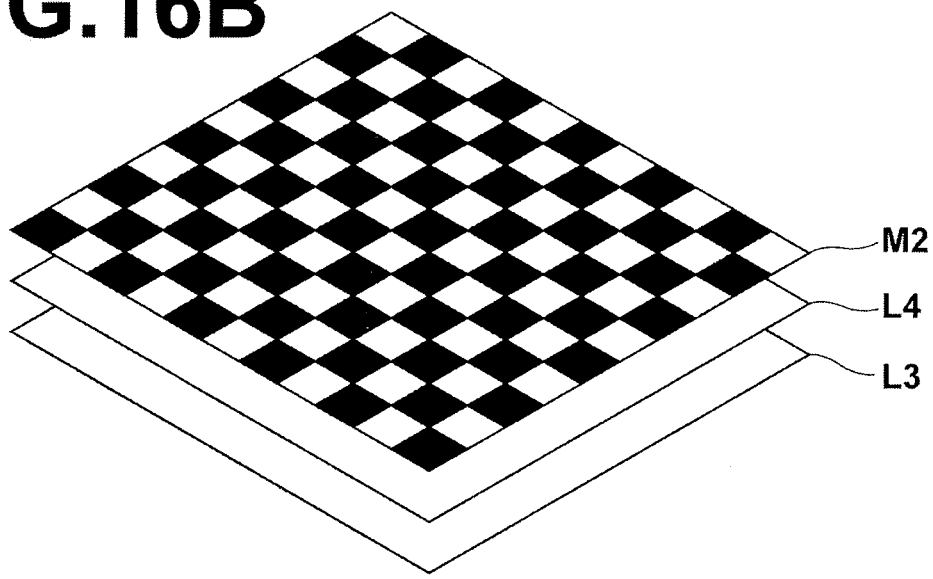
FIG. 16B is a diagram for explaining how lattice display is realized.

Hereinafter, the method by which lattice display is realized will be described with reference to FIG. 16A and FIG. 16B. The display control means 62 sets the degrees of opacity of layers that were not selected (not shown) from among the layers that constitute the layered image to 0%. Then, the degree of opacity of one of the two selected layers (layer 4 in this case) is set to 100%, and the degree of opacity of the other selected layer (layer 3 in this case) is set to 0%. In this state, a lattice mask M1 is utilized to generate a first masking image, in which portions of the layered image are masked, as illustrated in FIG. 16A. Next, the degrees of opacity of the two layers are inverted. That is, the degree of opacity of layer 4 is set to 0% and the degree of opacity of layer 3 is set to 100%. In this state, a lattice mask M2 is utilized to generate a first masking image, in which other portions of the layered image are masked, as illustrated in FIG. 16B. Here, the lattice mask M2 is a mask obtained by inverting the lattice mask M1. Thereafter, the display control means 62 outputs an image in which the first masking image and the second masking image overlap each other to the window W. Thereby, the display within the window W becomes that as illustrated in FIG. 14.

Note that when operations to change the section sizes of the lattice are performed, masks having sections of different sizes from those of the mask M1 and the mask M2 are utilized, and the same processes as those described above are executed. In addition, when operations to move the boundaries of the sections in a parallel manner are performed, the masks M1 and M2 are moved in a parallel manner during generation of the masking images, to change the masked range.

The lattice display facilitates specification of portions at which changes occur between examination dates, as described above. Further, in the lattice display, the section of the image prior to the change and the section of the image following the change are displayed adjacent to each other at locations at which the changes occur. Therefore, comparison of the states of the subject on the two examination dates is also facilitated. In the method in which the degrees of opacity are changed, a plurality of images are displayed in an overlapping manner. Therefore, it is difficult to discriminate changes in signal values at a certain point or within a certain range. However, in lattice display, if changes occur in signal values, the lattice pattern, in which the signal values prior to the change and the signals values following the change are alternately arranged, appear. Therefore, comparison of signal values is facilitated.

Note that in lattice display, if the sections are fixed, there are cases in which the lattice pattern will not appear depending on the area or position of the range in which changes occur. However, in the present embodiment, the boundaries of the sections can be varied, as illustrated in FIG. 15A and FIG. 15B. Therefore, changes that occur can be discriminated regardless of the size and position of the range in which the changes occur.

In the preset embodiment, the display control means 62 controls the degrees of opacity of each section of the lattice after performing the lattice display process. That is, the degrees of opacity of the images for observation arranged in the two selected layers are changed in response to operations to move the slide bar. Hereinafter, an example will be described for a case in which layer 4 and layer 3 are selected.

Figure 17A:
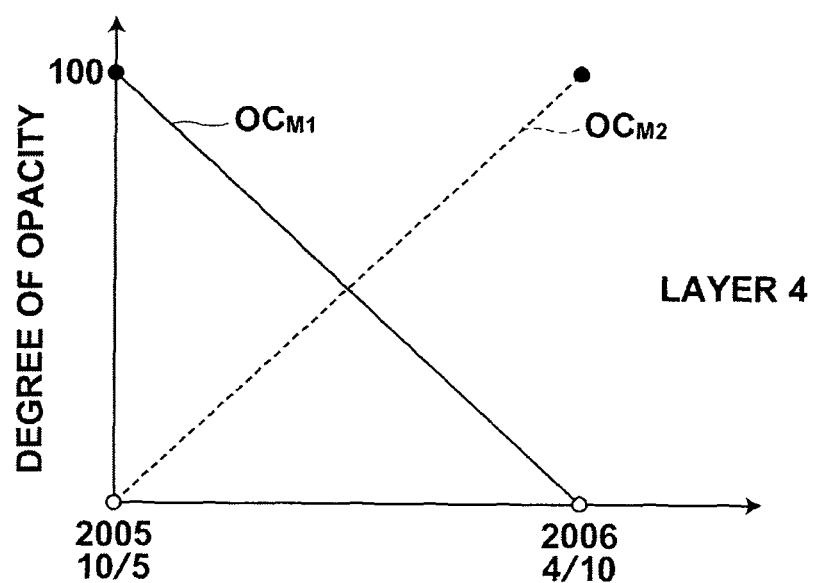
FIG. 17A is a diagram that illustrates an example of an opacity curve (layer 4).
Figure 17B:
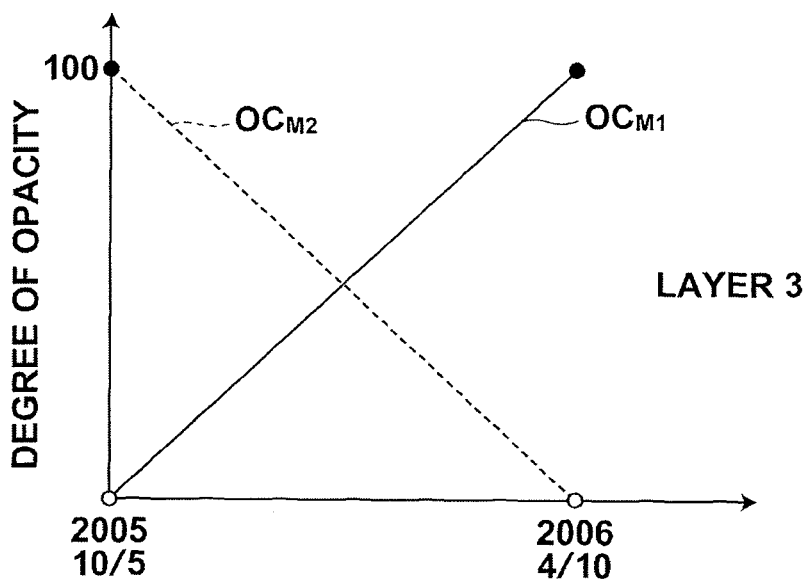
FIG. 17B is a diagram that illustrates an example of an opacity curve (layer 3).

FIG. 17A and FIG. 17B are diagrams that illustrate portions (only sections between the first examination date and the second examination date) of degree of opacity curves which are set for layer 4 and layer 3. The degree of opacity curves are selected or set by the aforementioned degree of opacity control means 66. The degree of opacity of each layer is changed based on a degree of opacity curve OCM1 when the masking image is generated employing the mask M1. On the other hand, degree of opacity of each layer is changed based on a degree of opacity curve OCM2 when the masking image is generated employing the mask M2.

As illustrated in FIGS. 17A and 17B, in the degree of opacity curve OCM1, the degree of opacity of the layer 4 monotonously decreases and the degree of opacity of the layer 3 monotonously increases in response to rightward movement of the slide bar. In the degree of opacity curve OCM2, the degree of opacity of the layer 4 monotonously increases and the degree of opacity of the layer 3 monotonously decreases in response to rightward movement of the slide bar. When the slide bar indicates an examination date, the image for observation of the layer that corresponds to the examination date is displayed with a degree of opacity of 100%. When the slide bar is positioned at a midpoint between two examination dates, the masking images generated employing the mask M1 and the mask M2 will become those in which the image for observation of layer 4 and the image for observation of layer 3 are mixed at the same percentages. That is, the images will be completely the same, and the lattice pattern will not be discriminated.

The lattice display may be performed at only a partial section of the temporal axis indicated by the slider SL. FIG. 18A and FIG. 18B illustrate examples of degree of opacity curves for a case in which lattice display is performed only in ½ of a section the temporal axis. Here, a section between a first examination date (Oct. 5, 2005) and a second examination date (Apr. 10, 2006) is divided into four sections. Each of the divided sections will be referred to as a first section, a second section, a third section, and a fourth section. The display control means 62 performs lattice display only in the second and third sections.

The degree of opacity curves are set such that the degree of opacity curve OCM2 matches the degree of opacity curve OCM1 in the first section. In this section, the degree of opacity of layer 4 monotonously decreases from 100% to 50%, and the degree of opacity of layer 3 monotonously increases from 0% to 50%. In the second and third sections, the degree of opacity curves are set such that the degree of opacity curve OCM2 is inverse the degree of opacity curve OCM1. In these sections, the degree of opacity curves OCM2 and OCM1 are set such that the degrees of opacity increase and decrease within a range from 0% to 100%, and such that the degrees of opacity of both layer 4 and layer 3 are 50% at the endpoints of these sections. In the fourth section, the degree of opacity curves are set such that the degree of opacity curve OCM2 matches the degree of opacity curve OCM1. In this section, the degree of opacity of layer 4 monotonously decreases from 50% to 0%, and the degree of opacity of layer 3 monotonously increases from 50% to 100%.

In the lattice display process, if the degrees of opacity are controlled referring to the degree of opacity curves illustrated in FIG. 18A and FIG. 18B, the transparency of the image of layer 4, which is displayed at the starting point of the first section (that is, the first examination date), increases in response to rightward movement of the slide bar, and the opacity of the image of layer 3 increases. In the first section, the images within the two regions that form the lattice are controlled based on the same degree of opacity curve, and therefore, the lattice pattern does not appear. At the endpoint of the first section, the two images, of which the degrees of opacity are set at 50%, are displayed in an overlapping manner.

In the second and third sections, the images within the two regions that form the lattice are controlled based on different degree of opacity curves, and therefore, the lattice pattern appears if there are any changes that occurred between examination dates. In these sections, it is possible to confirm changes that have occurred between examination dates, by increasing and decreasing the degrees of opacity of each group of regions by movement of the slide bar. Two images, of which the degrees of opacity are set to 50%, are displayed in an overlapped manner at the endpoints of the second and third sections, in the same manner as at the endpoint of the first section.

In the fourth section, the degree of transparency of the image of layer 4 increases further accompanying rightward movement of the slide bar. The degree of opacity, which had been set at 50%, is changed to an even lower degree of opacity, and becomes 0% at the endpoint of the fourth section. Conversely, degree of opacity of the image of layer 3, which had been set at 50%, is changed to an higher degree of opacity, and becomes 100% at the endpoint of the fourth section. As a result, only the image of layer 3 is displayed at the endpoint of the fourth section.

In the case that the degrees of opacity are controlled based on the degree of opacity curves illustrated in FIG. 17A and FIG. 17B, a single image that represents the state of the subject on a certain examination date suddenly changes to lattice display of two images accompanying movement of the slide bar. That is, the display will change discontinuously. In contrast, in the case that the degrees of opacity are controlled based on the degree of opacity curves illustrated in FIG. 18A and FIG. 18B, the changes in the screen display will become continuous and natural.

In the method that performs lattice display and further controls the degrees of opacity of each section of the lattice, advantageous effects similar to those obtained in the case that the degrees of opacity of the entireties of images are controlled can be obtained within each section of the lattice. In the case that it is desired to confirm changes in shapes of diseased portions, etc., the section size may be set to a size larger than that of the diseased portions and observation may be performed in units of single sections. In the case that it is desired to confirm changes in signal values of the diseased portions, the section size may be set to a size smaller than that of the diseased portions, and differences in colors, etc. among sections may be observed. That is, this method may be used according to the intended purpose in this manner.

Next, a case in which the process to be executed by the display control means 62 is set to "stereoscopic display" will be described. In this setting as well, the display control means 62 displays an image group that represents the state of an examination date in the image region IMG when the slide bar B indicates a date on which the examination was performed. In addition, when the slide bar B indicates a point in time other than an examination date, two layers are selected by the display control means 62. The method by which the layers are selected is the same as in the case of "lattice display".

In the stereoscopic display setting, the display control means 62 supplies an image for observation of one of the selected layers as a right field of view image, and an image for observation of the other selected layer as a left field of view image to a display capable of performing stereoscopic display, when the slide bar B is positioned within a section between examination dates. In stereoscopic display, portions of the field of view images that match appear as though they are far away, and portions that do not match appear as though they are close to the viewer. In the case that there are locations at which changes have occurred between examination dates, such locations appear to float toward the viewer. Therefore, users can easily discriminate whether changes occurred, and the locations of such changes.

Next, a case in which the process to be executed by the display control means 62 is set to "morphing display" will be described. This setting becomes effective in cases that the layered image generating means performs rigid positioning or non rigid positioning. The layered image generating means correlates anatomically matching points within a plurality of images for observation and calculates the sizes and directions of displacements (vectors) for each of the correlated points during the positioning process. Thereby, deformation vector fields are estimated for the plurality of images for observation that constitute the layered images.

The display control means 62 generates intermediate images to be employed for morphing display prior to the slide bar B being operated. A plurality of the intermediate images are generated utilizing the deformation vector fields estimated by the layered image generating means, and stored in the memory. Alternatively, the intermediate images may be generated while the slide bar B is being operated.

The display control means 62 displays an image group that represents the state of an examination date in the image region IMG when the slide bar B indicates a date on which the examination was performed, in a manner similar to the display performed when other settings are set. In addition, when the slide bar B indicates a point in time other than an examination date, two layers are selected by the display control means 62. The plurality of intermediate images which have been generated from the images for observation of the two selected layers are read out from the memory, intermediate images corresponding to the position of the slight bar B are selected from among the read out intermediate images, and the selected intermediate images are displayed. Alternatively, necessary intermediate images are generated according to the position of the slide bar B, and the generated intermediate images are displayed. By this process, changes due to the progression of disease can be displayed as videos in a manner coordinated with the operation of the slide bar B.

In the morphing display, users can not only discriminate whether changes have occurred and the locations of such changes, but can also estimate the state of progression of the changes between examination dates, based on the displayed images.

Four processes have been described as processes to be executed by the display control means 62. Another possible process is that in which changes to be applied to the screen are defined as functions, and the dates/times indicated by the slide bar B are input as parameters of the functions. For example, functions that change display attributes other than the degree of opacity (such as color and display magnification), display ranges, and display positions may be defined. The process performed by the display control means 62 may be any process as long as it changes the display of the images for observation that constitute the layered images, and is not limited to the above examples.

In the embodiment described above, the display of all of the image windows is changed simultaneously. Alternatively, in the embodiment that displays the diagnosis screen 75 of FIG. 5, only the display of the image window which is activated by the image window control means 61 may be changed. As a further alternative, in the embodiment that displays the diagnosis screen 76 of FIG. 6, only the display within image windows in which operations of the slide bar B are detected may be changed.

In addition, in the embodiment described above, the images to be layered are positioned by matching the tree structures extracted by the coronary artery extracting process. Alternatively, positioning may be performed among the sets of volume data prior to extracting observation targets such as the coronary arteries. In the case that positioning of the sets of volume data is performed in advance, if a coronary artery region is extracted from one set of volume data, coronary artery regions included in other sets of volume data can be estimated from the positional relationships among the sets of volume data. This method is preferable in cases that the algorithm for extracting a subject is complex, and the extracting process takes time, because the processing time as a whole can be reduced.

In addition, in FIG. 8 and the description corresponding thereto, only image generating sections which are necessary to realize the layouts illustrated in FIGS. 4A through 4C were described. However, as described previously, the layout of the diagnosis screen differs according to the target of diagnosis. For this reason, it is preferable for the observation image generating means 64 to be further equipped with a great number of program modules in addition to those listed in the aforementioned description. Examples of such program modules include those that generate MIP (Maximum Intensity Projection) images, bulls eye images, virtual endoscope images, etc. It is preferable for the observation image generating means 64 to select and utilize the program modules according to selected functions (targets of diagnosis).

The above embodiment has been described as a client/server system. Alternatively, a single computer may function as the volume data storage means, the volume data selecting means, the observation image generating means, the layered image generating means, and the display control means. In addition, the processes performed by the diagnosis WS 6 in the embodiment described above may be divided among a plurality of computers and executed.

With respect to devices that constitute the system, such as the input device and the display, various known devices may be employed. For example, a joystick may be substituted for the mouse, and a touch panel may be substituted for the display. The interface for specifying points along the temporal axis is also not limited to the slider and the mouse wheel, and various types of interfaces may be applied.

As described above, the present invention is not limited to the embodiment described above. Various changes and modifications are possible, as long as they do not stray from the spirit of the invention. In addition, the present invention is not limited to assisting diagnosis of coronary arteries, and may be employed to assist diagnosis of various living tissue. Further, the present invention is not limited to assisting diagnosis of living organisms, and may be utilized for periodic inspections to assess deterioration of machinery and the like.

What is claimed is:

1. A diagnosis assisting system, comprising:
    volume data storage means, for storing a plurality of sets of volume data, obtained by imaging at least one subject a plurality of times on different imaging dates/times, in a predetermined storage device, correlated with subject identifying data and imaging date/time data;
    volume data selecting means, for selecting a plurality of sets of volume data correlated with subject identifying data that represents a specified subject, from among the sets of volume data stored in the storage device;
    observation image generating means, for generating an image for observation that represents the specified subject for each set of volume data selected by the volume data selecting means, and for correlating the images for observation and the imaging date/time data of the set of volume data corresponding thereto;
    layered image generating means, for generating layered images, by positioning and overlapping the plurality of generated images for observation;
    display control means, for arranging the layered images on a predetermined screen, for detecting operations that move a point along a temporal axis on the screen, and for changing the display of the images for observation that constitute the layered image arranged on the screen based on the detected operations; and
    degree of opacity control means, for setting the degree of opacity of each image for observation that constitutes the layered image; wherein:
    the display control means changes the degree of opacity of the images for observation that constitute the layered image arranged on the screen, based on the detected operations and the setting of the degree of opacity control means, and
    the degree of opacity control means sets the degree of opacity of the images for observation to be a maximum value when the point along the temporal axis is on the imaging date/time correlated to the images for observation, and sets the degree of opacity of the images for observation to become lower as the date indicated by the point becomes farther from the imaging date/time correlated to the images for observation.

2. The diagnosis assisting system as defined in claim 1, wherein:
    the degree of opacity control means sets the degree of opacity of each image for observation such that the degree of opacity of one or two of the plurality of images for observation is a value greater than 0%, and the degrees of opacity of other images for observation are 0%.

3. The diagnosis assisting system as defined in claim 1, wherein:
    the display control means sections the region in which the layered image is sectioned in the form of a lattice, and performs different display control within two groups of regions formed by alternately arranged lattice sections.

4. The diagnosis assisting system as defined in claim 1, wherein:
    the display control means performs stereoscopic display, by designating one image for observation from among the images for observation that constitute the layered image as a right field of view image, and designating another image for observation as a left field of view image.

5. The diagnosis assisting system as defined in claim 1, wherein:
    the positioning performed by the layered image generating means is one of rigid positioning or non rigid positioning; and
    the display control means performs morphing display based on deformation vector fields which are estimated during the positioning process.

6. The diagnosis assisting system as defined in claim 1, wherein:
    the observation image generating means generates a plurality of images for observation having different observation formats from each set of volume data;
    the layered image generating means generates layered images, in which images for observation of the same observation format are overlapped, for each observation format; and
    the display control means arranges the plurality of generated layered images on the screen.

7. The diagnosis assisting system as defined in claim 6, wherein:
    the display control means changes the display of the plurality of images for observation that constitute each of the plurality of layered images.

8. The diagnosis assisting system as defined in claim 6, further comprising:
    image window control means, for arranging a plurality of image windows, which are switchable between an active state and an inactive state, on the screen, and for controlling the switching thereof; wherein
    the display control means arranges the layered images into each image window, and changes the display of images for observation that constitutes a layered image within an image window in the active state.

9. A computer readable non transitory recording medium having recorded therein a diagnosis assisting program that when executed, causes at least one computer to perform a diagnosis assisting method, comprising the steps of:
    storing a plurality of sets of volume data, obtained by imaging at least one subject a plurality of times on different imaging dates/times, in a predetermined storage device, correlated with subject identifying data and imaging date/time data;
    selecting a plurality of sets of volume data correlated with subject identifying data that represents a specified subject, from among the sets of volume data stored in the storage device;
    generating an image for observation that represents the specified subject for each set of volume data selected by the volume data selecting means, and for correlating the images for observation and the imaging date/time data of the set of volume data corresponding thereto;
    generating layered images, by positioning and overlapping the plurality of generated images for observation;

arranging the layered images on a predetermined screen, for detecting operations that move a point along a temporal axis on the screen, and for changing the display of the images for observation that constitute the layered image arranged on the screen based on the detected operations; and setting the degree of opacity of each image for observation that constitutes the layered image; wherein:

the degree of opacity of the images for observation that constitute the layered image arranged on the screen is changed based on the detected operations and the setting of the degree of opacity, and the degree of opacity of the images for observation is set to be a maximum value when the point along the temporal axis is on the imaging date/time correlated to the images for observation, and the degree of opacity of the images for observation is set to become lower as the date indicated by the point becomes farther from the imaging date/time correlated to the images for observation.

10. A diagnosis assisting method that causes at least one computer to:

store a plurality of sets of volume data, obtained by imaging at least one subject a plurality of times on different imaging dates/times, in a predetermined storage device, correlated with subject identifying data and imaging date/time data;

select a plurality of sets of volume data correlated with subject identifying data that represents a specified subject, from among the sets of volume data stored in the storage device;

generate an image for observation that represents the specified subject for each set of volume data selected by the volume data selecting means, and for correlating the images for observation and the imaging date/time data of the set of volume data corresponding thereto;

generate layered images, by positioning and overlapping the plurality of generated images for observation;

arrange the layered images on a predetermined screen, for detecting operations that move a point along a temporal axis on the screen, and for changing the display of the images for observation that constitute the layered image arranged on the screen based on the detected operations; and set the degree of opacity of each image for observation that constitutes the layered image; wherein:

the degree of opacity of the images for observation that constitute the layered image arranged on the screen is changed based on the detected operations and the setting of the degree of opacity, and the degree of opacity of the images for observation is set to be a maximum value when the point along the temporal axis is on the imaging date/time correlated to the images for observation, and the degree of opacity of the images for observation is set to become lower as the date indicated by the point becomes farther from the imaging date/time correlated to the images for observation.

* * * * *